(12) United States Patent
Wu et al.

(10) Patent No.: US 10,287,775 B2
(45) Date of Patent: *May 14, 2019

(54) FUNCTIONAL ROOF CONSTRUCTION METHOD AND ARRANGEMENT

(71) Applicants: Shih Hsiang Wu, Zhupei (TW); Cheng Lin Wu, Zhupei (TW); Chia I Wu, Newark, CA (US)

(72) Inventors: Shih Hsiang Wu, Zhupei (TW); Cheng Lin Wu, Zhupei (TW); Chia I Wu, Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/826,623

(22) Filed: Nov. 29, 2017

(65) Prior Publication Data

US 2018/0094438 A1     Apr. 5, 2018

Related U.S. Application Data

(63) Continuation-in-part of application No. 15/093,728, filed on Apr. 7, 2016, now Pat. No. 9,863,149.

(51) Int. Cl.
*E04D 3/18* (2006.01)
*E04D 3/24* (2006.01)
(Continued)

(52) U.S. Cl.
CPC .............. *E04D 3/18* (2013.01); *E04D 3/24* (2013.01); *E04D 3/30* (2013.01); *E04D 3/36* (2013.01);
(Continued)

(58) Field of Classification Search
CPC .. E04D 3/18; E04D 3/366; E04D 3/30; E04D 3/36; E04D 3/24; E04D 13/1693; E04D 2013/045; F24S 20/67; H02S 40/44; H02S 40/20; H02S 40/24; H02S 30/10; H02S 20/23; H02S 40/12
See application file for complete search history.

(56) References Cited

U.S. PATENT DOCUMENTS 4,189,881 A * 2/1980 Hawley ............. E04D 3/366
                                                    52/91.3
4,215,675 A * 8/1980 Embree ............. F24S 25/67
                                                    126/661
(Continued)

FOREIGN PATENT DOCUMENTS

CA        2771387 A1 * 10/2012 ............. H01R 4/26
CN      201822032 U  *  5/2011
(Continued)

*Primary Examiner* — Jeanette E Chapman
(74) *Attorney, Agent, or Firm* — Raymond Y. Chan; David and Raymond Patent Firm

(57) ABSTRACT

A functional roof construction arrangement for a roof frame of a building, includes a plurality of functional roof modules being assembled together. Each of the functional roof modules includes a module housing and a roof functional unit which includes three different roof functional panel units selectively supported by the module housing at different levels thereof to provide different functions for the building. The roof functional panel units are selectively configured for selectively providing multiple functions of solar energy collection, thermal insulation, sound insulation, wireless network system, and the like.

20 Claims, 20 Drawing Sheets

(51) Int. Cl.

| | | |
|---|---|---|
| *H02S 40/12* | (2014.01) | |
| *H02S 20/23* | (2014.01) | |
| *H02S 30/10* | (2014.01) | |
| *E04D 13/16* | (2006.01) | |
| *E04D 3/30* | (2006.01) | |
| *H02S 20/24* | (2014.01) | |
| *H02S 40/44* | (2014.01) | |
| *E04D 3/36* | (2006.01) | |
| *F24S 20/67* | (2018.01) | |
| *E04D 3/366* | (2006.01) | |
| *E04D 13/04* | (2006.01) | |

(52) U.S. Cl.
CPC ......... *E04D 3/366* (2013.01); *E04D 13/1693* (2013.01); *F24S 20/67* (2018.05); *H02S 20/23* (2014.12); *H02S 20/24* (2014.12); *H02S 30/10* (2014.12); *H02S 40/12* (2014.12); *H02S 40/44* (2014.12); *E04D 2013/045* (2013.01); *Y02B 10/12* (2013.01)

(56) References Cited

U.S. PATENT DOCUMENTS

| | | | | |
|---|---|---|---|---|
| 4,401,839 A * | 8/1983 | Pyle | ............... | B32B 15/20 136/244 |
| 6,093,884 A * | 7/2000 | Toyomura | ............... | E04D 3/366 126/621 |
| 9,574,352 B2 * | 2/2017 | Den Boer | ............... | H02S 20/26 |
| 9,863,149 B2 * | 1/2018 | Wu | ............... | E04D 3/352 |
| 2007/0235021 A1 * | 10/2007 | Reed | ............... | E04D 13/031 126/621 |
| 2007/0295387 A1 * | 12/2007 | Adriani | ............... | H01L 31/0392 136/251 |
| 2011/0036039 A1 * | 2/2011 | Wang | ............... | E04D 3/30 52/582.2 |
| 2011/0239554 A1 * | 10/2011 | Tsuzuki | ............... | F24S 20/67 52/173.3 |
| 2011/0269087 A1 * | 11/2011 | DuChateau | ............... | F24S 80/52 432/29 |
| 2012/0096781 A1 * | 4/2012 | Romesburg | ............... | E04B 7/12 52/173.3 |
| 2012/0186633 A1 * | 7/2012 | Carolan | ............... | E04D 3/352 136/251 |
| 2014/0246078 A1 * | 9/2014 | Carolan | ............... | B32B 15/046 136/251 |
| 2014/0311548 A1 * | 10/2014 | Moon | ............... | H01L 31/0201 136/244 |
| 2014/0311552 A1 * | 10/2014 | Garrett | ............... | H02S 20/24 136/251 |
| 2014/0338731 A1 * | 11/2014 | Park | ............... | H02S 40/34 136/251 |
| 2016/0254779 A1 * | 9/2016 | Park | ............... | H02S 30/10 136/251 |
| 2017/0098723 A1 * | 4/2017 | Oh | ............... | H01L 31/048 |
| 2017/0366131 A1 * | 12/2017 | Stearns | ............... | F24S 25/636 |

FOREIGN PATENT DOCUMENTS

| | | | | |
|---|---|---|---|---|
| DE | 1960194 A1 * | 6/1971 | ............... | E04B 2/56 |
| DE | 202011101834 U1 * | 9/2012 | ............... | E04D 3/30 |
| EP | 1944425 A3 * | 12/2011 | ............... | E04D 13/0305 |
| FR | 1502735 A * | 11/1967 | ............... | E04D 3/366 |

* cited by examiner

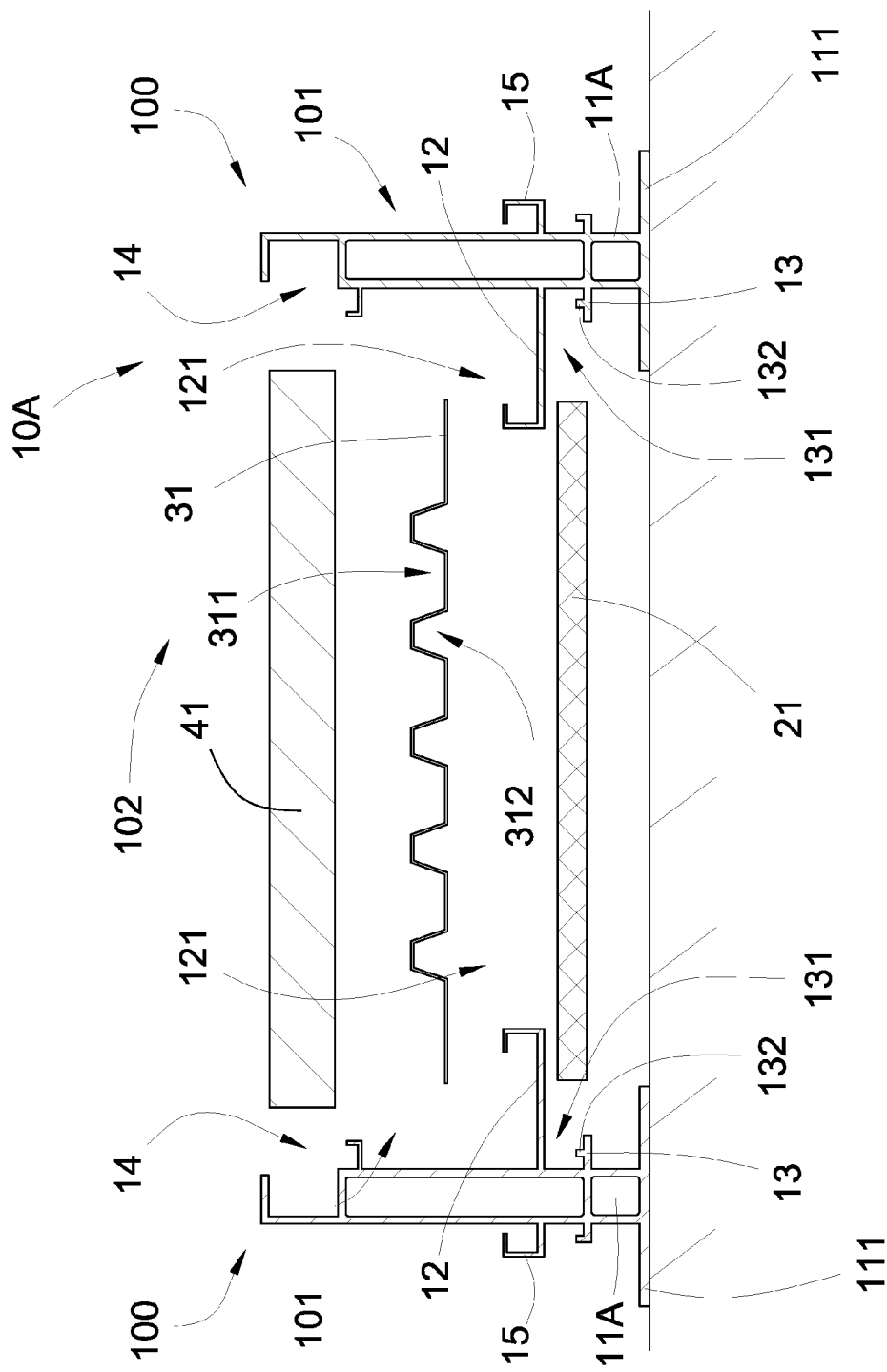

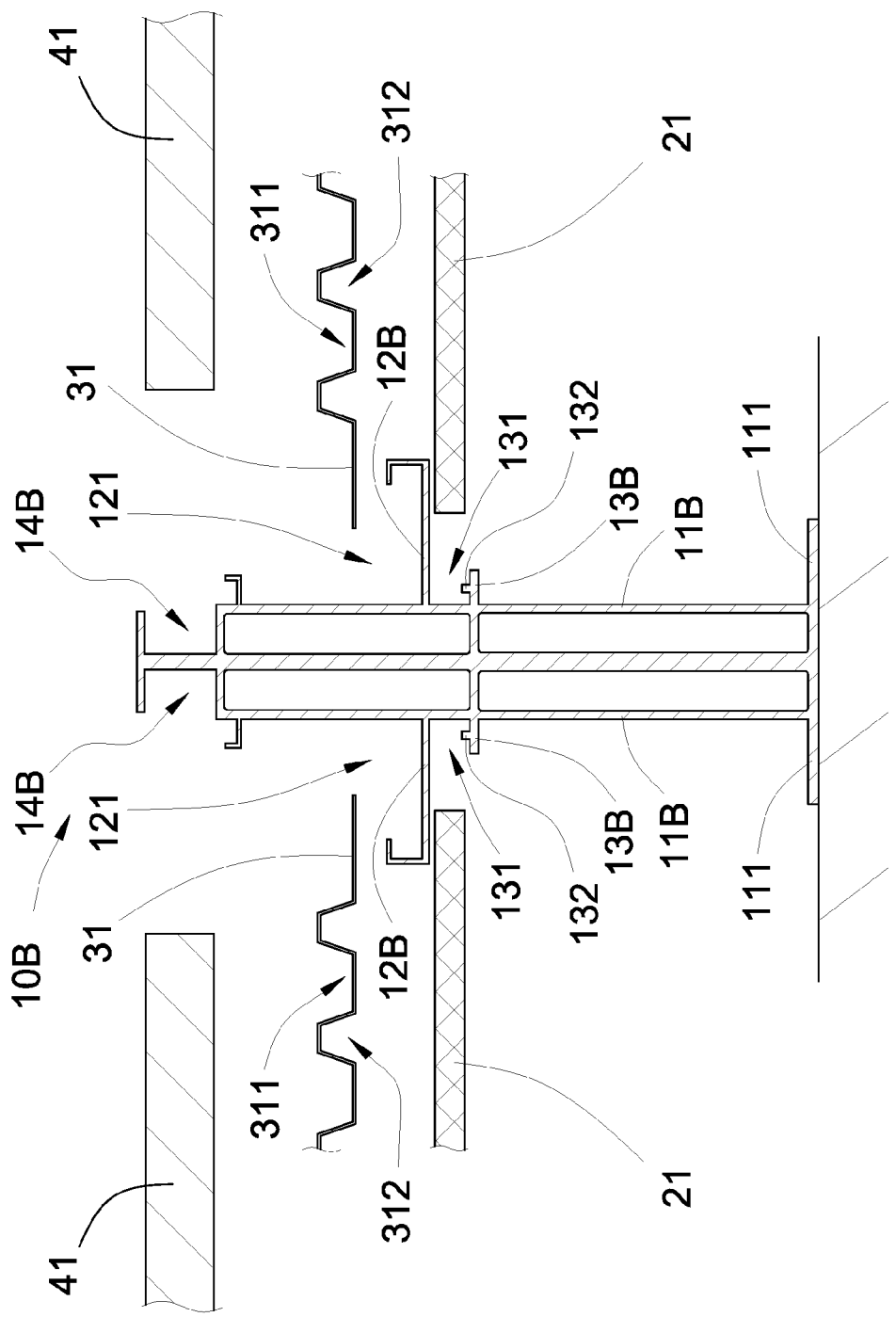

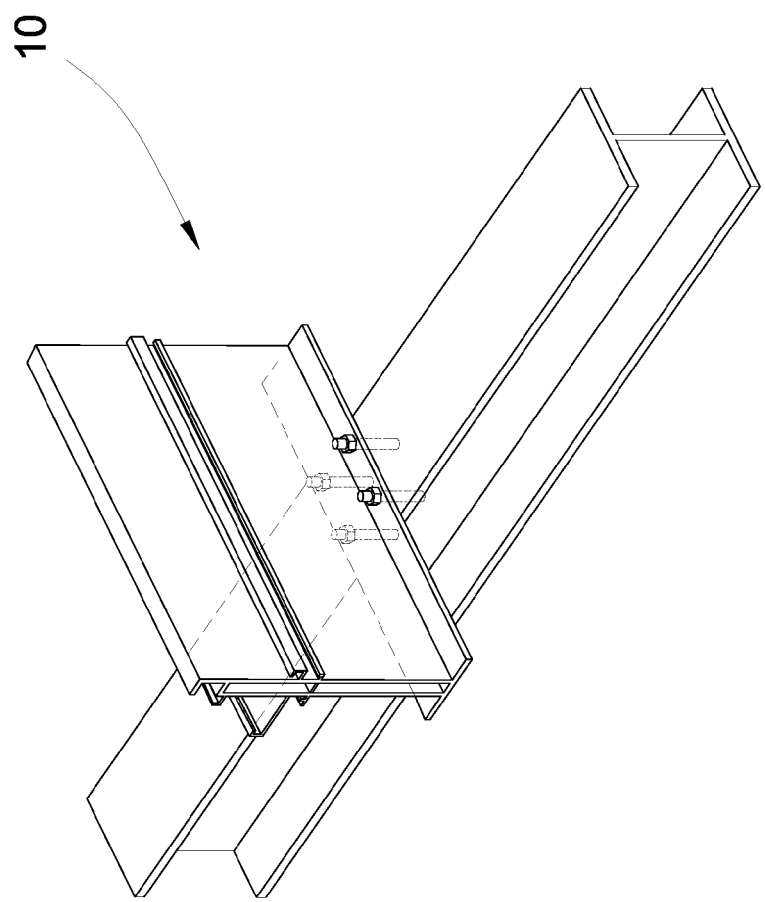

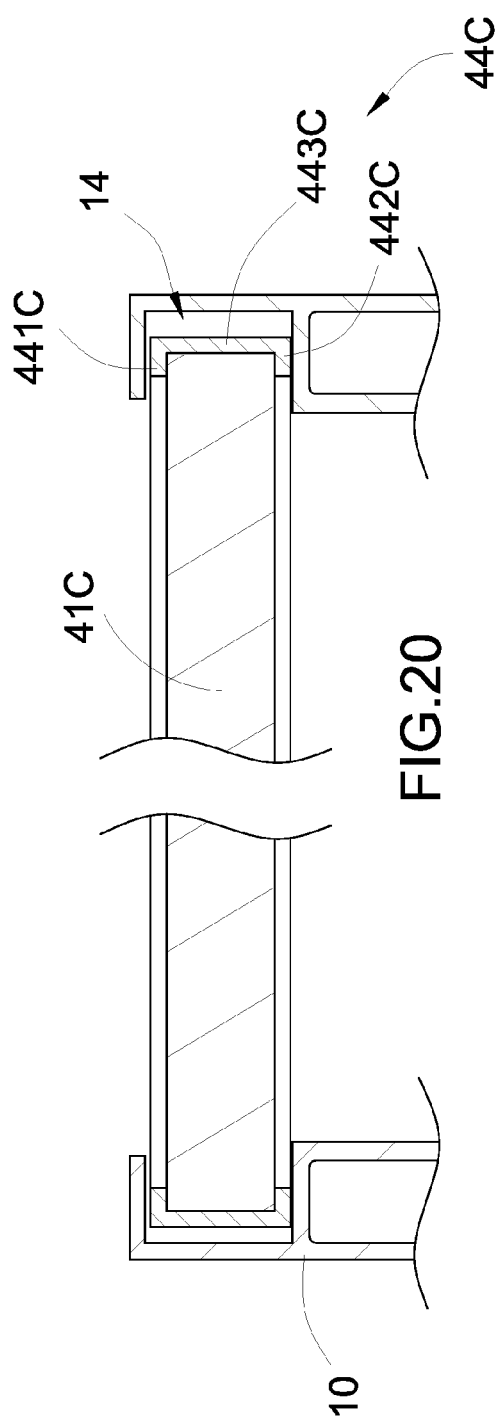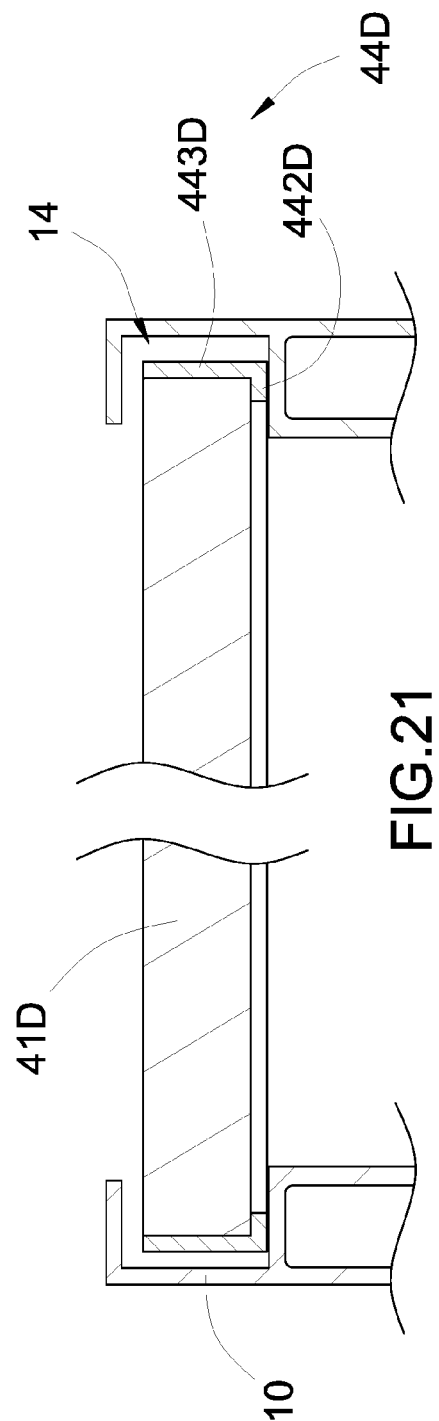

FUNCTIONAL ROOF CONSTRUCTION METHOD AND ARRANGEMENT

CROSS REFERENCE OF RELATED APPLICATION

This is a Continuation-In-Part application that claims the benefit of priority under 35 U.S.C. § 120 to a non-provisional application, U.S. application Ser. No. 15/093,728, filed Apr. 7, 2016.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a roof structure, and more particularly to a functional roof construction method and arrangement, wherein a plurality of functional roof modules are assembled to form a rigid roof structure for selectively providing multiple functions of solar energy collection, thermal insulation, sound insulation, wireless network system, and the like.

Description of Related Arts

Architects have many roof designs in the building industry over the last few decades since the roof serves as a building envelop to effectively protect the interior of the building. A conventional roof structure comprises a plurality of roof beams supported on a supporting frame of the building to define a roof surface thereon, and a plurality of roof layers overlaid on the roof surface to provide heat insulation and waterproof feature for protecting the building. Accordingly, the roof layers can be a waterproof roofing membrane and a plurality of roof materials, such as roof shingles or tiles, stacked on the roofing membrane. Accordingly, extra heat insulation material, such as fiberglass insulation or foam insulation, must be added under the roof surface within the attic of the building to control the interior temperature of the building effectively. In other words, the conventional roof structure provides poor heat insulation. In addition, the conventional roof structure has several drawbacks.

The conventional roof structure is hard to repair especially when a portion thereof is damaged. For example, when there is a water leakage, the constructers must remove the roof materials and replace the waterproof roofing membrane. It is time consuming and is a waste of material since the roof materials cannot be re-used. The repairing cost of the damaged roof structure is relatively high to include the labor cost of the constructers. In addition, the conventional roof structure has a limited service lifespan depending on the material thereof In other words, the life expectancy of the roof varies between different roof materials. For example, the life expectancy of the asphalt roof shingles is about 15 to 20 years. Therefore, the house owner should replace the entire roof structure before the lifespan of the roof structure is end.

Even though many roof designs are found to improve the roof materials and/or the efficiency of the roof, the basic frame structure of the roof has not be changed. In other words, the foundation of the roof structure is still constructed by the waterproof roofing membrane and the roof materials. The improved roof materials can only prolong the lifespan of the roof structure and can enhance the efficiency of thereof. However, the above existing problems cannot be solved.

A significant improvement of the conventional roof structure is the solar roofs. Accordingly, the solar roof, which is a rooftop solar system, comprises a plurality of solar panels mounted on top of the roof surface via a panel supporting frame. However, the solar panels are costly and required licensed roof contractors to install. Because of the weight of the solar panels, the licensed roof contractors must calculate the stress and the loading requirements of the roof structure before the installation of the solar panels. Therefore, the rooftop solar system may not be able to install on the old roof structure. In addition, the installation of the rooftop solar system requires drilling on the roof structure, such that the existing roof structure will be damaged.

SUMMARY OF THE PRESENT INVENTION

The invention is advantageous in that it provides a functional roof construction method and arrangement, wherein a plurality of functional roof modules are assembled to form a rigid roof structure for selectively providing multiple functions of solar energy collection, thermal insulation, sound insulation, wireless network system, and the like.

Another advantage of the invention is to a functional roof construction method and arrangement, wherein different functional panels can be selectively supported in a module housing at different levels for providing multiple functions.

Another advantage of the invention is to a functional roof construction method and arrangement, wherein the functional panels can be releasably locked at the module housing to retain the functional panels in position.

Another advantage of the invention is to a functional roof construction method and arrangement, wherein the functional roof modules can be easily assembled together to form a rigid roof structure. Therefore, depending the size of the building, the number of functional roof modules can be selected to form the roof structure so as to enhance the practical use of the present invention and to reduce the installation cost thereof.

Another advantage of the invention is to a functional roof construction method and arrangement, wherein water, such as rain, can be collected and re-cycling used. In particular, the water can be filtered and purified for drinking, garden watering, and the like.

Another advantage of the invention is to a functional roof construction method and arrangement, wherein the functional roof modules are easy to repair by replacing the entire malfunctioned module or by simply replacing the damaged functional panel in the functional roof module, so as to minimize the maintenance cost of the functional roof module.

Another advantage of the invention is to a functional roof construction method and arrangement, wherein the functional operating module can be additionally incorporated with the function roof module to provide an additional function, such as Internet router, rechargeable battery, communication device, and/or security system, for the building.

Another advantage of the invention is to a functional roof construction method and arrangement, which simplifies the roof structural configuration of the existing roof structure.

Another advantage of the invention is to a functional roof construction method and arrangement, wherein a water piping system and/or electrical wiring system can be installed into the functional roof construction arrangement so as to simplify the configuration of the water piping system and/or electrical wiring system of the building.

Another advantage of the invention is to a functional roof construction method and arrangement, which does not require to alter the original structural design of the roof frame of the building, so as to minimize the manufacturing cost of the functional roof module incorporating with the existing roof frame of the building. In particular, the functional roof modules can also be mounted on the roof frame of the mobile home or even a recreational vehicle.

Another advantage of the invention is to a functional roof construction method and arrangement, wherein no expensive or complicated structure is required to employ in the present invention in order to achieve the above mentioned objects. Therefore, the present invention successfully provides an economic and efficient solution for providing a rigid configuration for the roof frame of the building and for providing different functions for the building.

Additional advantages and features of the invention will become apparent from the description which follows, and may be realized by means of the instrumentalities and combinations particular point out in the appended claims.

According to the present invention, the foregoing and other objects and advantages are attained by a functional roof construction arrangement for a roof frame of a building, includes a plurality of functional roof modules being assembled together. Each of the functional roof modules includes a module housing and a roof functional unit which includes three different roof functional panel units selectively supported by the module housing at different levels thereof to provide different functions for the building. The roof functional panel units are selectively configured for selectively providing multiple functions of solar energy collection, thermal insulation, sound insulation, wireless network system, and the like.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 16 illustrates a first alternative mode of the supporting frame according to the above preferred embodiment of the present invention.

FIG. 17 illustrates a second alternative mode of the supporting frame according to the above preferred embodiment of the present invention.

FIGS. 18A to 18D illustrates the supporting frame coupled at different roof frames according to the above preferred embodiment of the present invention.

FIG. 20 is a sectional view of the first alternative mode of the solar collecting panel according to the above preferred embodiment of the present invention.

FIG. 21 illustrates a second alternative mode of the solar collecting panel according to the above preferred embodiment of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 6:
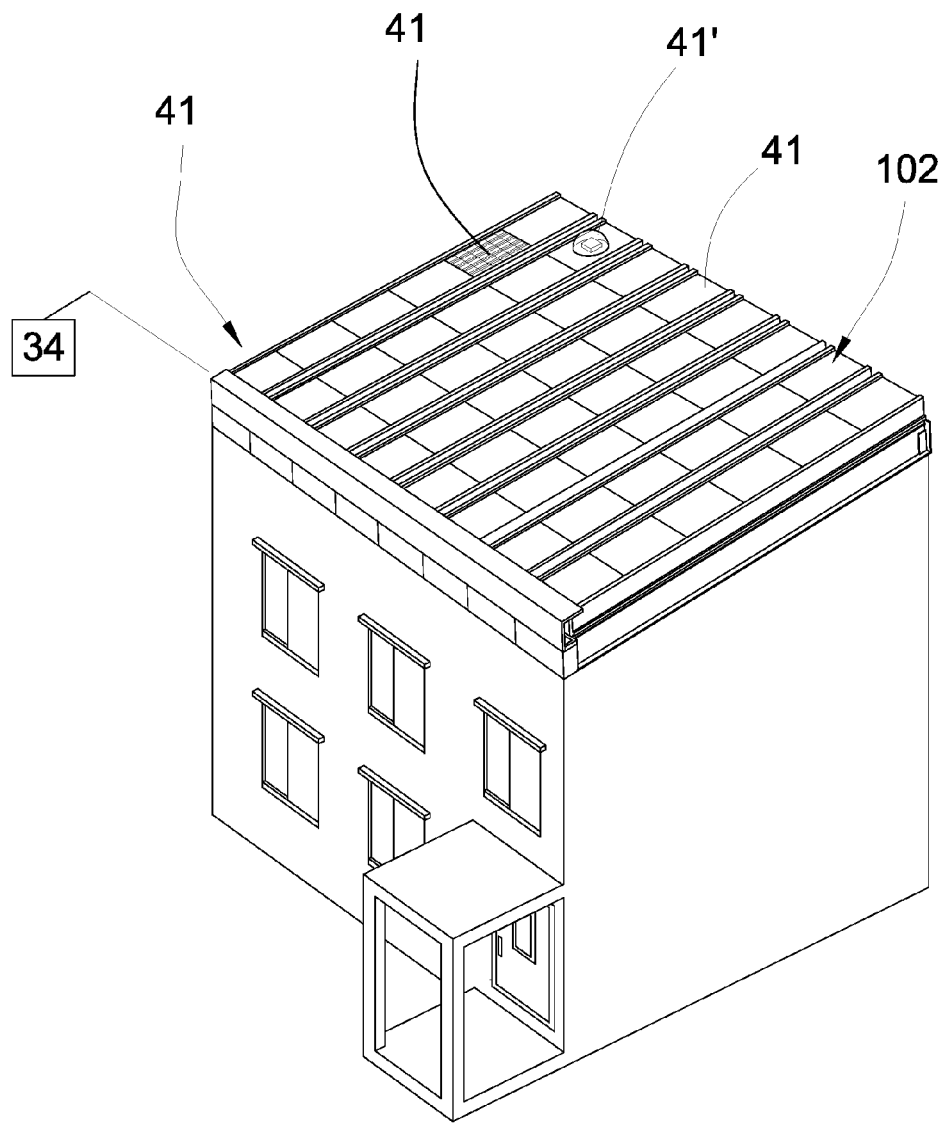
FIG. 6 illustrates the functional roof construction arrangement installed at the roof of the building according to the above preferred embodiment of the present invention.

Referring to FIGS. 1 to 5 of the drawings, a functional roof construction arrangement according to a preferred embodiment of the present invention is illustrated, wherein the functional roof construction arrangement of the present invention is arranged for mounting on a roof frame of a building to replace the existing roof structure, as shown in FIG. 6. In particular, the roof frame of the building has a predetermined pitch to define a slope that the roof frame is constructed to have an inclined configuration at a sloping direction.

According to the preferred embodiment, the functional roof construction arrangement comprises a plurality of functional roof modules 100 being assembled together to form a rigid roof structure for the roof frame of the building. Depending the size of the roof frame, various numbers of functional roof modules 100 are selectively assembled to form the roof structure having size and shape corresponding to the roof frame of the building. Accordingly, each of the functional roof modules 100 comprises a module housing 101 and a roof functional unit 102.

Figure 18A:
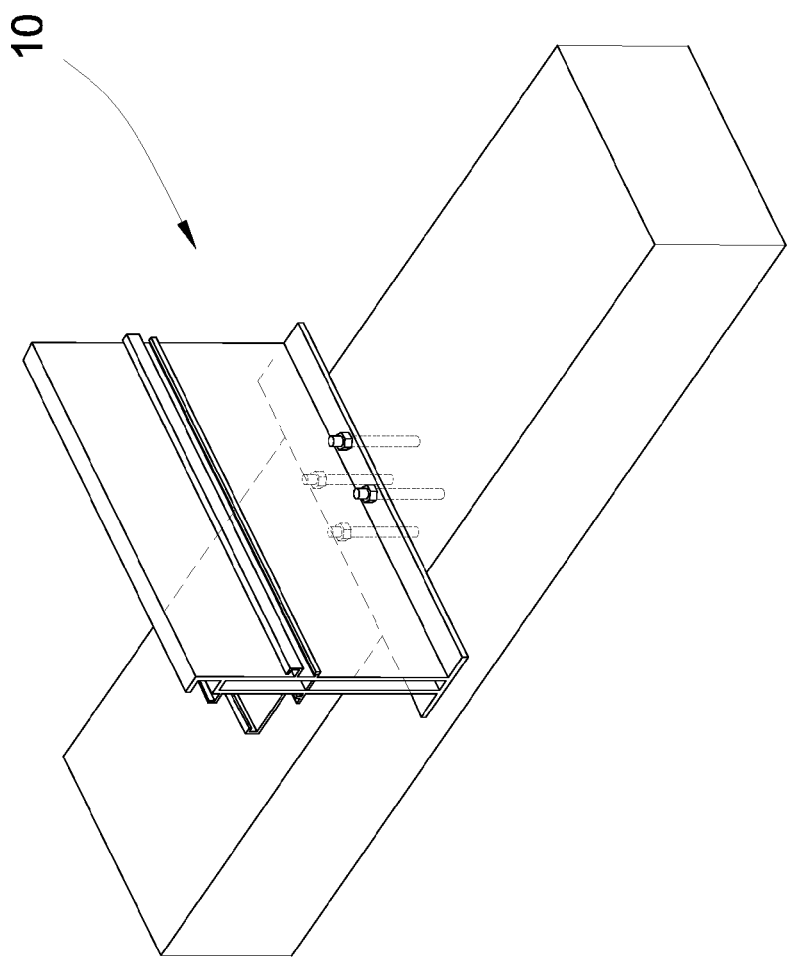

The module housing 101 comprises two supporting frames 10. Each of the supporting frames 10 comprises a supporting wall 11 extended vertically, and a supporting arm 12 perpendicularly extended from the supporting wall 11 to define an upper portion of the module housing 101 above the supporting arm 12 and a lower portion of the module housing 101 below the supporting arm 12 for attaching to the roof frame. Accordingly, the supporting wall 11 has a base platform 111 formed at a bottom edge for attaching to the roof frame. FIGS. 18A and 18B illustrates the supporting frame 10 coupled at different roof frames. In FIG. 18A, the supporting frame 10 is coupled at a roof beam via screws. FIG. 18B, the supporting frame 10 is coupled at a I-shaped roof reinforcing bar via screws.

Each of the supporting frames 10 further comprises a supporting ridge 13 extended from the supporting wall 11 at a position parallel to and below the supporting arm 12 to define a ridge slot 131 between the supporting ridge 13 and the supporting arm 12. In particular, a length of the supporting arm 12 is longer than a length of the supporting ridge 13. The supporting wall 11 has an outer side and an inner side, wherein the supporting arm 12 and the supporting ridge 13 are spacedly extended from the inner side of the supporting wall 11. In addition, the supporting wall 11 of each of the supporting frames 10 has a hollow structure to form a double-wall structure for enhancing the rigidity of the supporting frame 10 and to define an air chamber therewithin for providing thermal and/or sound insulation of the module housing 101. Therefore, the outer side of the supporting wall 11 is defined at a side surface of one of the double-wall structure while the inner side of the supporting wall is defined at a side surface of another double-wall structure.

Figure 7:
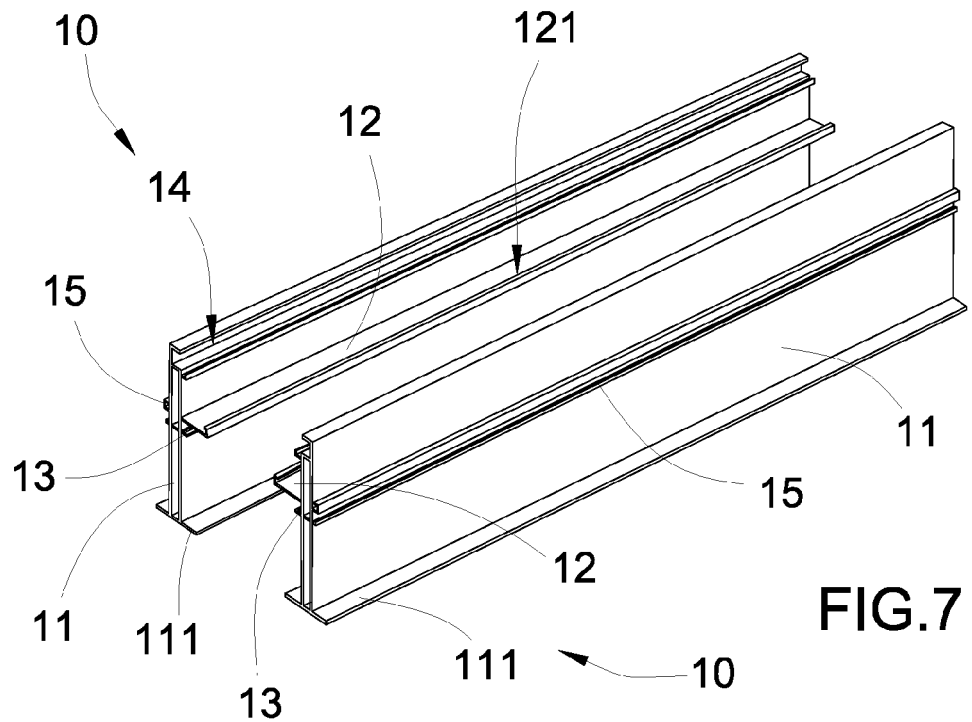
FIG. 7 illustrates the supporting frames located side-by-side according to the above preferred embodiment of the present invention.

Each of the supporting frames 10 further has a sliding slot 14 longitudinally formed at a top edge of the supporting wall 11, wherein an elongated opening of the sliding slot 14 is configured to face at a direction with respect to an extension direction of the supporting arm 12. As shown in FIG. 7, when the supporting frames 10 are spacedly aligned with each other, the supporting walls 11 of the supporting frames 10 are extended in parallel. The supporting arms 12 of the supporting frames 10 are spacedly aligned with each other end-to-end and the supporting ridges 13 of the supporting frames 10 are spacedly aligned with each other end-to-end. In addition, the sliding slots 14 of the supporting frames 10 are spacedly aligned and facing with each other.

The roof functional unit 102 comprises different functional panel units supported by the module housing 101 at different levels. In particular, the roof functional unit 102 comprises a first roof functional panel unit 20 slidably supported by the supporting ridges 13 of the supporting frames 10, a second roof functional panel unit 30 slidably supported by the supporting arms 12 of the supporting frames 10 at a position below the first roof functional panel unit 20, and a third roof functional panel unit 40 slidably engaged with the sliding slots 14 of the supporting frames 10 at a position spacedly above the first roof functional panel unit 20. Accordingly, the first through third roof functional panel units 20, 30, 40 provide different functions for the building.

As shown in FIGS. 2 to 5, the first roof functional panel unit 20 comprises a plurality of thermal insulation panels 21 and a plurality of panel dividers 22. Two edge portions of each of the thermal insulation panels 21 are supported by the supporting ridges 13 of the supporting frames 10 respectively. In particular, the two edge portions of each of the thermal insulation panels 21 are slid at the ridge slots 131 of the supporting frames 10 respectively. It is worth mentioning that each of the thermal insulation panels 21 is made of thermal insulation material to form a radiant barrier for reflecting radiant heat when the sun heats the functional roof construction arrangement of the present invention. Preferably, each of the thermal insulation panels 21 is also made of sound insulation material to form a soundproof roof structure.

Each of the panel dividers 22 is located and sealed between every two of the thermal insulation panels 21 to retain the thermal insulation panels 21 in position. Accordingly, each of the panel dividers 22 is made of rigid material, such as metal, and has a hollow structure to define an air cavity therein to serve as a thermal and/or sound insulation chamber. In addition, each of the panel dividers 22 has two side surfaces wherein two adjacent thermal insulation panels 21 are biased against the side surfaces of the panel dividers 22, such that the panel divider 22 is sandwiched between two thermal insulation panels 21. It is worth mentioning that a gap between the panel divider 22 and the thermal insulation panel 21 is sealed by sealing material such as silicone.

Figure 2:
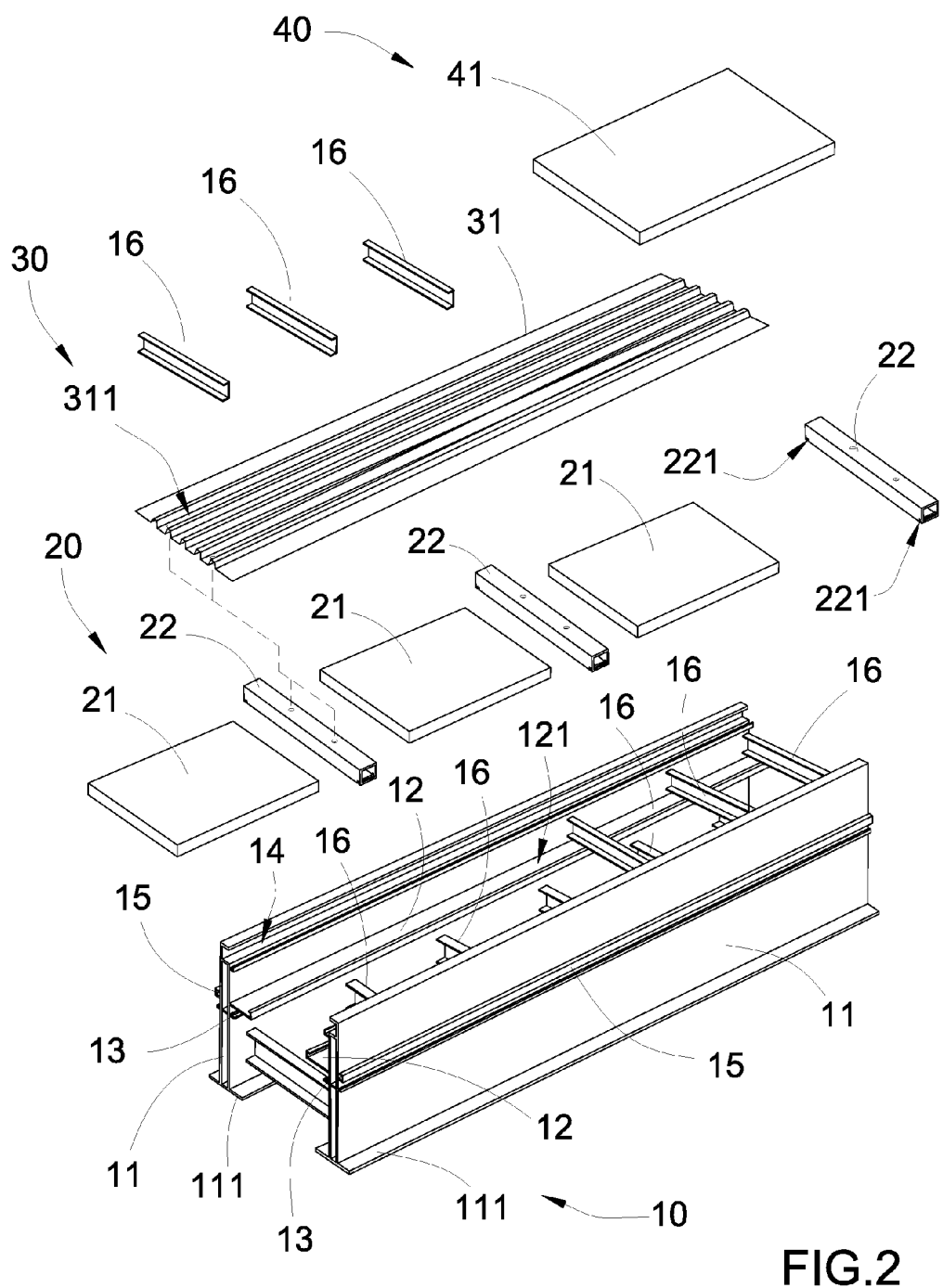
FIG. 2 is an exploded perspective view of a functional roof module of the functional roof construction arrangement according to the above preferred embodiment of the present invention.
Figure 3:
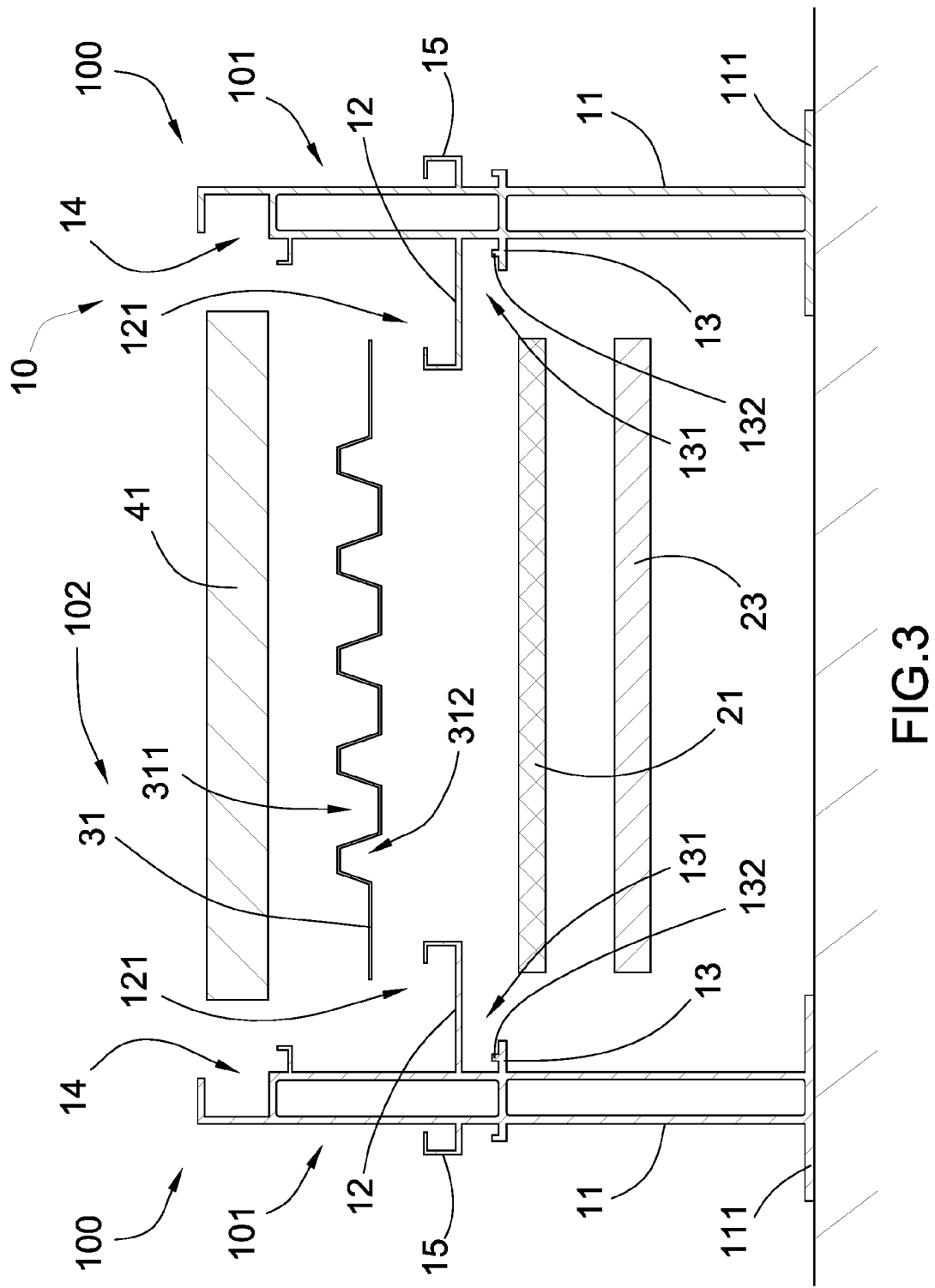
FIG. 3 is an exploded sectional view of the functional roof module of the functional roof construction arrangement according to the above preferred embodiment of the present invention.

As shown in FIGS. 2 and 3, two ends of each of the panel dividers 22 are attached between the supporting frames 10 to enhance the rigidity of the module housing 101. Accordingly, each of the supporting ridges 13 has a retention rim 132 extended upwardly at the ridge slot 131. Each of the panel dividers 22 has two bottom slits 221, wherein the retention rims 132 of the supporting ridges 13 are engaged with the bottom slits 221 of the panel divider 22 to support and retain the panel divider 22 in position. It is worth mentioning that the panel dividers 22 provide multiple functions of reinforcing the structure of the module housing 101, retaining the thermal insulation panels 21 in position, and supporting the second roof functional panel unit 30 above the thermal insulation panels 21. It is appreciated that two ends of each of the panel dividers 22 can be attached between the supporting frames 10 by attaching the ends of the panel divider 22 at the supporting ridges 13 of the supporting frames 10 via screws respectively.

According to the preferred embodiment, the first roof functional panel unit 20 comprises a sound insulation layer 23 mounted in the module housing 101 at the lower portion thereof at a position below the thermal insulation panels 21.

The second roof functional panel unit 30 comprises at least a waterproof panel supported by the supporting arms 12 of the supporting frames 10 respectively. In particular, the waterproof panel can be a water guard drainage panel 31, wherein two edge portions of the water guard drainage panel 31 supported by the supporting arms 12 of the supporting frames 10 respectively. The water guard drainage panel 31 is made of waterproof material to prevent water, such as rain, entering under the water guard drainage panel 31. As supporting the water guard drainage panel 31 at the supporting arms 12 of the supporting frames 10, the water guard drainage panel 31 is supported at the upper portion of the module housing 101, such that the water is blocked by the water guard drainage panel 31 to prevent the water entering into the lower portion of the module housing 101. In other words, no water will be entered into the first roof functional panel unit 20. It is worth mentioning that since the length of the supporting arm 12 is larger than the length of the supporting ridge 13, when the second roof functional panel unit 30 is slidably supported by the supporting arms 12 of the supporting frames 10, the two side edge portions of the second roof functional panel unit 20 are covered by the supporting arms 12 respectively to ensure no water to be entered into the lower portion of the module housing 101.

Figure 4:
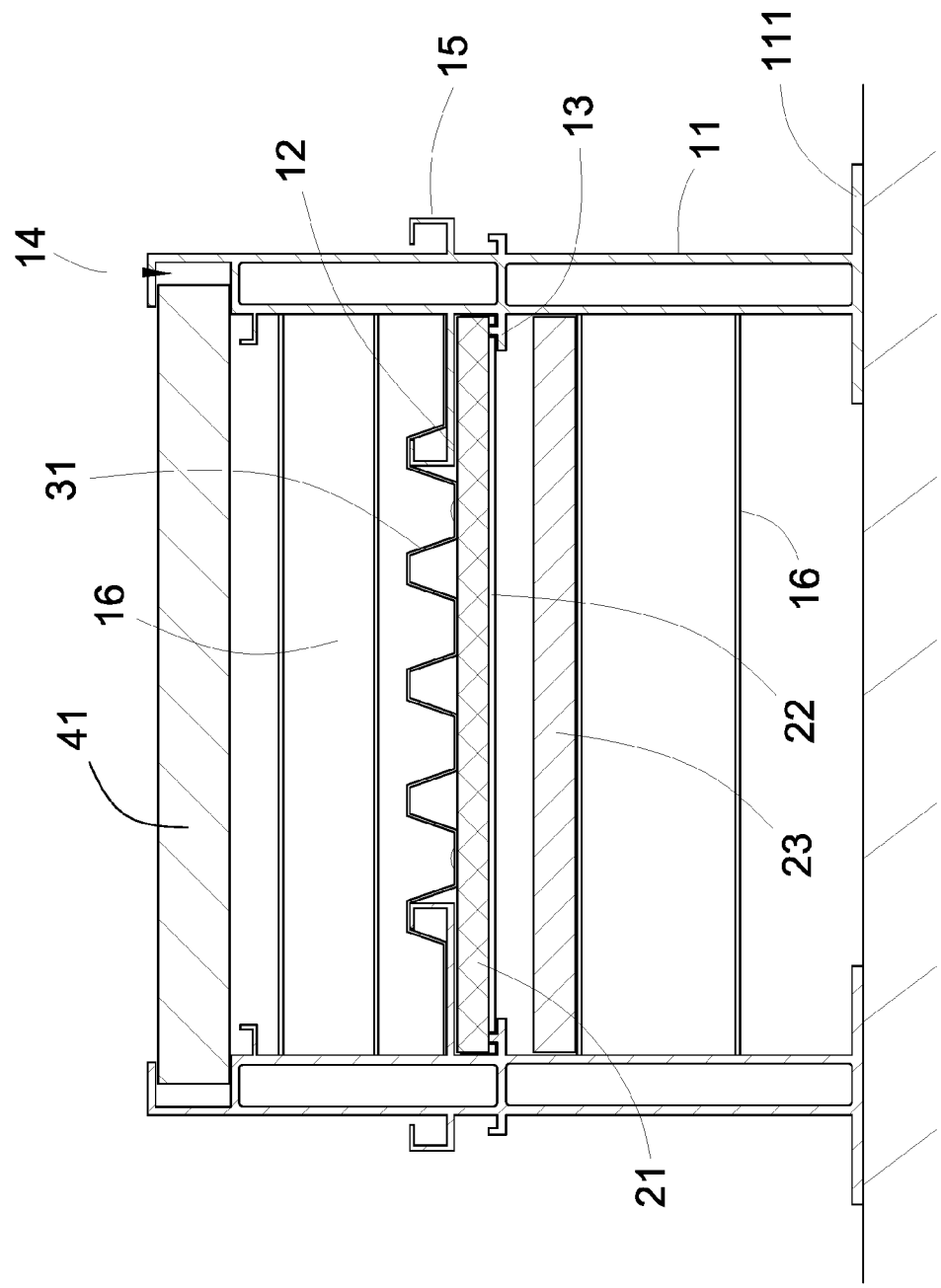
FIG. 4 is a sectional view of the functional roof module of the functional roof construction arrangement at the longitudinal direction according to the above preferred embodiment of the present invention.
Figure 5:
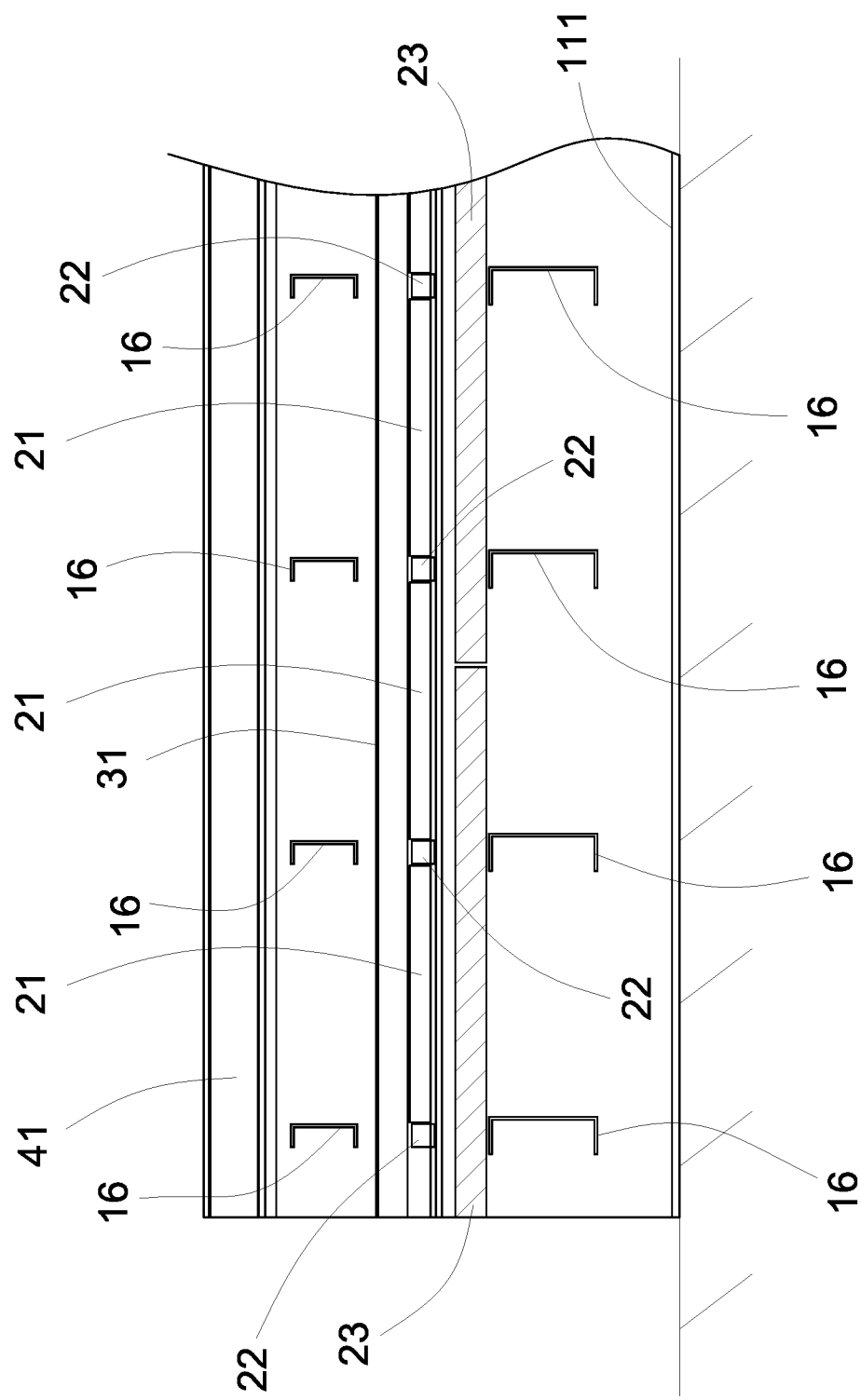
FIG. 5 is a sectional view of the functional roof module of the functional roof construction arrangement at the transverse direction according to the above preferred embodiment of the present invention.

As shown in FIGS. 3 and 4, the water guard drainage panel 31 has a corrugated cross section and defines a plurality of water drainage channels 311 extended longitudinally along the sloping direction of the roof structure so as to guide the water to flow downwardly. In other words, when the module housing 101 is mounted on the roof frame of the building at the slope thereof, an up-slope side of the module housing 101 and a down-slope side thereof are correspondingly defined with respect to the sloping direction of the roof frame. Therefore, the water is collected and is guided to flow along the water drainage channels 311 from the up-slope side of the module housing 101 to the down-slope side thereof at the sloping direction of the roof structure.

As configuring the water guard drainage panel 31 with said corrugated cross section, the water drainage channels 311 are defined on a top side of the water guard drainage panel 31 and a plurality of engaging channels 312 are formed on a bottom side of the water guard drainage panel 31. As shown in FIGS. 2 to 4, each of the supporting arms 12 has a L-shaped coupling free end 121 coupled at the side portion of the water guard drainage panel 31. In particular, the coupling free ends 121 of the supporting arms 12 are selectively engaged with the engaging channels 312 at the side portions of the water guard drainage panel 31 respectively. Therefore, the two side portions of the water guard drainage panel 31 are locked at the supporting arms 12 of the supporting arm 10 to retain the water guard drainage panel 31 in position so as to form a water barrier for preventing the water entering into the lower portion of the module housing 101.

It is worth mentioning that the water guard drainage panel 31 is also coupled to the panel dividers 22 not only for reinforcing the strength of the water guard drainage panel 31 to be secured within the module housing 101 but also for preventing any vibration within the module housing 101 when wind force is applied thereto.

The second roof functional panel unit 30 further comprises a water collecting gutter 33 coupled to the module housing 101 for collecting the water from the water guard drainage panel 31 so as to prevent the water flowing to the lower portion of the module housing 101. Accordingly, the water collecting gutter 33 is coupled at the down-slope side of the module housing 101. Preferably, the water collecting gutter 33 has a U-shaped cross section to have an upper gutter cover 331 coupled at the top edges of the supporting frames 11 of the supporting frames 10 and a bottom gutter tray 332 aligned with the water guard drainage panel 31 to collect the water therefrom. It is worth mentioning that the bottom gutter tray 332 of the water collecting gutter 33 is located above the lower portion of the module housing 101 to prevent the water leaking thereinto. Therefore, the functional roof construction arrangement of the present invention has a built-in gutter, such that no rain gutter is required for mounting at the roof frame of the building. It is appreciated that the water collecting gutter 33 can be formed as a water collecting pipe line connected to the down-slope side of the module housing 101 to collect the water from the water guard drainage panel 31.

As the water is collected, the collected water can be recycling used. Accordingly, the second roof functional panel unit 30 further comprises a water reservoir 34 communicatively connected to the water collecting gutter 33 to store the water from the water guard drainage panel 31. A water purification/filtration system can be incorporated with the water reservoir 34 to purify/filter the water, such that the user is able to drink the water or use the water to water the garden, to flush the toilet and the like.

According to the preferred embodiment, the third roof functional panel unit 40 comprises a plurality of solar collecting panels 41 slidably coupled with the sliding slots 14 of the supporting frames 10 to support at the top edges of the supporting walls 11 in an edge-to-edge manner. The solar collecting panels 41 are electrically connected with each other for collecting solar energy. The third roof functional panel unit 40 further comprises a solar energy convertor 42 electrically linked to the solar collecting panels 41 for converting the solar energy into electrical energy. Accordingly, the solar energy convertor 42 can be directly connected to an electrical meter of the building or to a rechargeable battery 43 for storing the electrical energy. It is worth mentioning that the third roof functional panel unit 40 is supported spacedly apart the second roof functional panel unit 30 to form an air circulation chamber therebetween for ensuring the air circulation within the upper portion of the module housing 101.

According to the preferred embodiment, the third roof functional panel unit 40 further comprises two panel blockers 32 coupled at the top edges of the supporting frames 10 respectively to retain the solar collecting panels 41 for preventing the solar collecting panels 41 being slid downwardly when the module housing 101 is inclinedly supported on the roof. Accordingly, each of the panel blockers 32 has a L-shaped cross section mounted at the supporting wall 11 to bias against a bottom edge corner of the solar collecting panel 41. Preferably, the panel blockers 32 are coupled at the top edges of the supporting frames 10 respectively at the down-slope side only because the solar collecting panels 41 will slide from the up-slope side of the module housing 101 to the down-slope side thereof.

Figure 13:
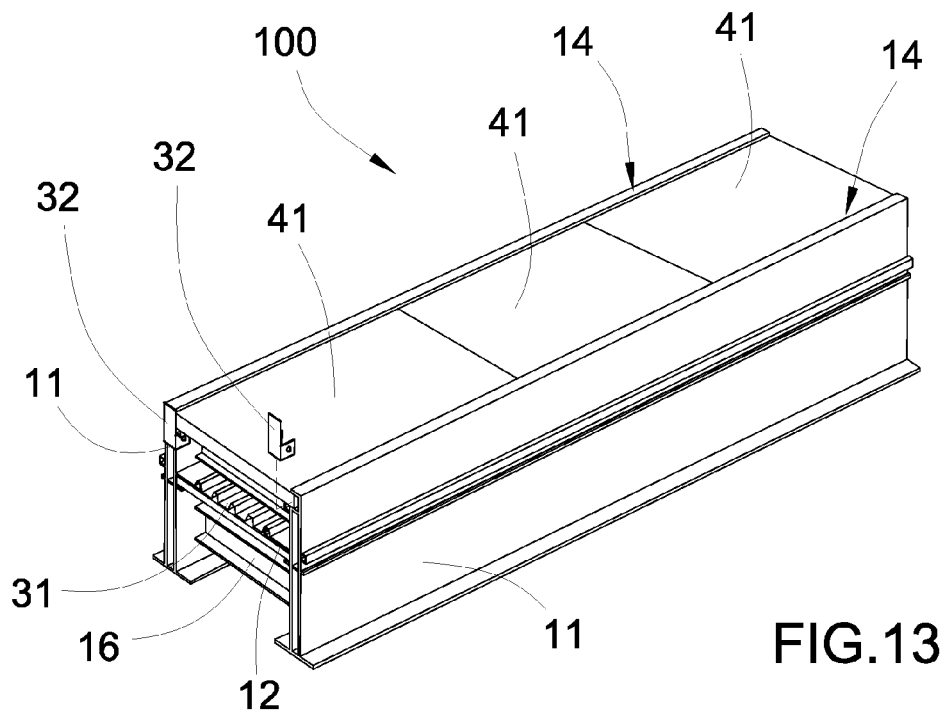
FIG. 13 illustrates the installation of the panel blockers according to the above preferred embodiment of the present invention.

It is worth mentioning that the panel blockers 32 also serve as two blockers to retain the solar collecting panels 41 for preventing the solar collecting panels 41 being slid downwardly when the module housing 101 is inclinedly supported on the roof In addition, the panel blockers 32 are coupled at the top edges of the supporting frames 10 to serve as two water drainage gutters for guiding the water to flow from the sliding slots 14 to the water guard drainage panel 31. In particular, the panel blockers 32 are coupled at the top edges of the supporting frames 10 respectively to align with the sliding slots 14 thereof respectively for guiding the water to flow from the sliding slots 14 to the water guard drainage panel 31. As shown in FIG. 13, each of the L-shaped panel blockers 32 is mounted at the supporting wall 11 defining an upper water entrance communicating with the sliding slot 14 and a bottom water exit for draining the water from the sliding slot 14 to the water guard drainage panel 31. Accordingly, the panel blockers 32 are coupled at the top edges of the supporting frames 10 respectively at the down-slope side only because the water will only flow along the sliding slots 14 from the up-slope side of the module housing 101 to the down-slope side thereof.

Figure 1:
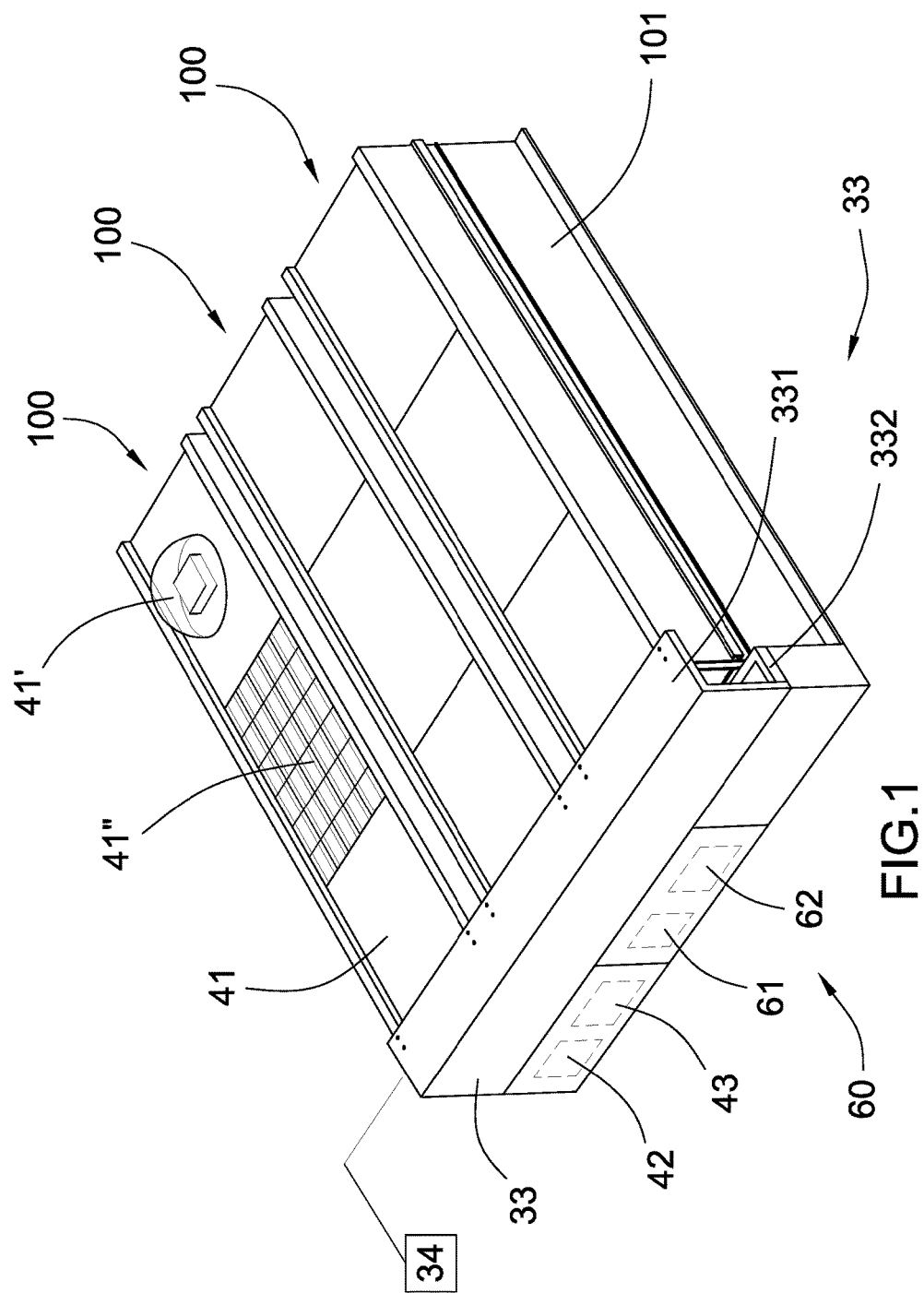
FIG. 1 is a perspective view of a functional roof construction arrangement according to a preferred embodiment of the present invention.
Figure 14:
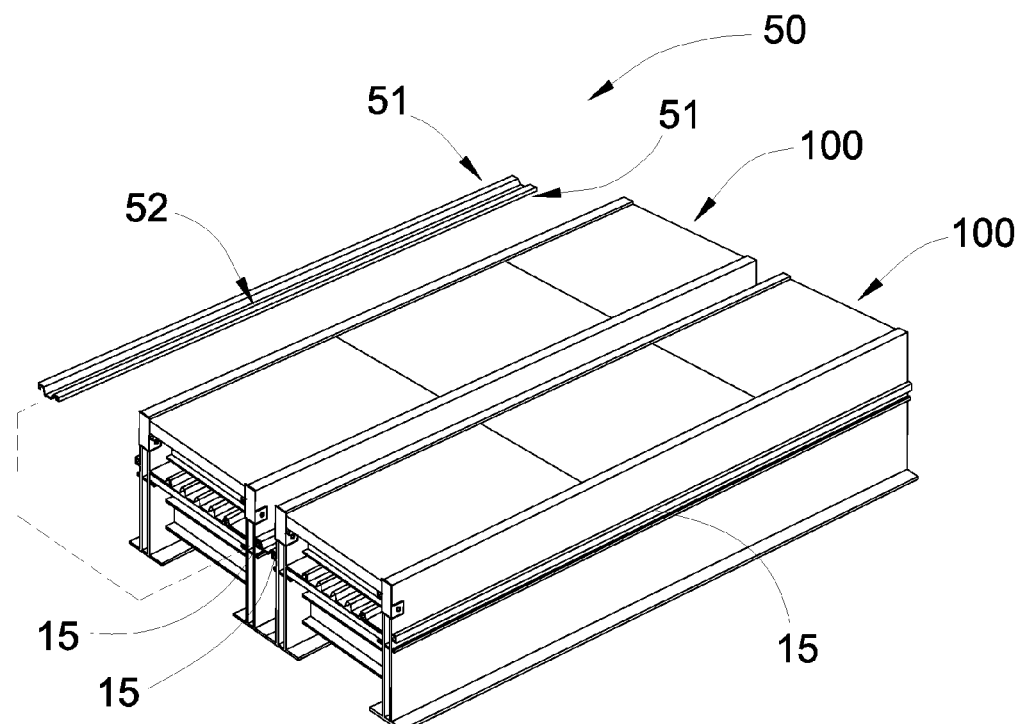
FIG. 14 illustrates the installation of the module housings via the module connector according to the above preferred embodiment of the present invention.

As shown in FIGS. 1 and 14, the functional roof construction arrangement further comprises a module connector 50 for connecting two of the functional roof modules 100 with each other side-by-side. Accordingly, each of the supporting frames 10 further comprises a locking ridge 15 extended from the supporting wall 11. In particular, the locking ridge 15, having L-shaped locking rim, is extended from the outer side of the supporting wall 11 at a direction opposite to the supporting arm 12. Preferably, the locking ridge 15 is extended to align with the supporting arm 12.

The module connector 50 has two locking edges 51 and an indented water guiding channel 52 extended between the locking edges 51, wherein when two of the module housings 101 are located side-by-side, the locking edges 51 of the module connector 50 are engaged and water-sealed with the locking ridges 15 of the two module housings 101 respectively so as to lock up the functional roof modules 100 with each other. Preferably, the locking edges 51 of the module connector 50 are interlocked with the locking ridges 15 of the two module housings 101 respectively. It is worth mentioning that the water collecting gutter 33 can be configured that the length of the water collecting gutter 33 is long enough to couple with two or more module housings 101, such that the water collecting gutter 33 can collect the water from different water guard drainage panels 31 at different module housings 101 to the water reservoir 34 at the same time. In addition, the water collecting gutter 33 can also collect the water from the water guiding channel 52 of the module connector 50 as well.

The functional roof construction arrangement further comprises a functional operating module 60 coupled to at least one of the functional roof modules 100, wherein functional operating module 60 is arranged to provide an additional function for the building. Accordingly, the functional operating module 60 has a waterproof housing 61 coupled at the lower portion of the module housing 101 and an operation unit 62 received in the waterproof housing 61 to provide the additional function for the building.

Figure 15:
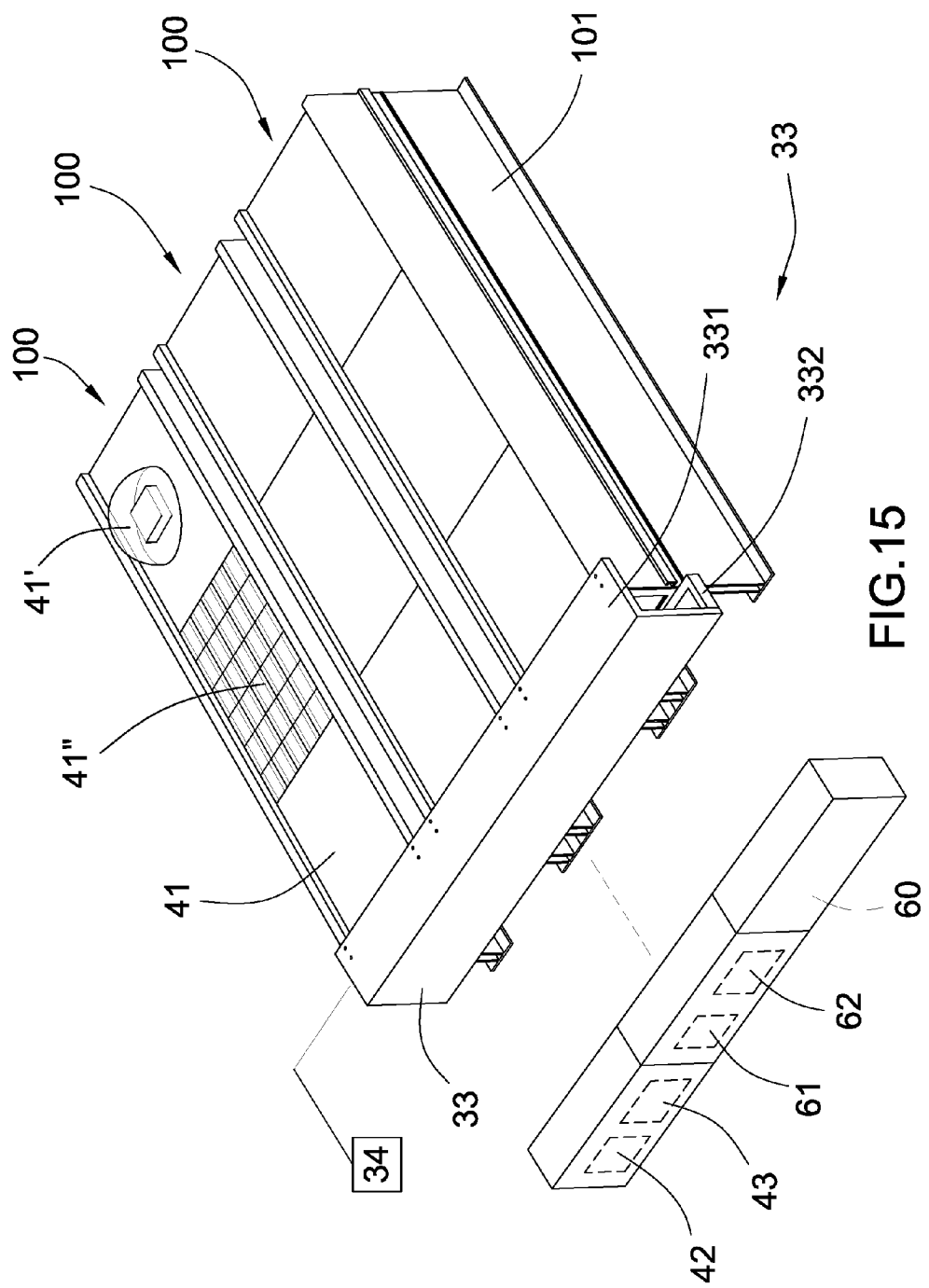
FIG. 15 illustrates the installation of the water collecting gutter and the functional operating module according to the above preferred embodiment of the present invention.

As shown in FIGS. 1 and 15, the waterproof housing 61 is mounted under the bottom gutter tray 332 of the water collecting gutter 33, such that no water will flow to the waterproof housing 61. The waterproof housing 61 provides a double-protection to ensure the protection of the operation unit 62.

The operation unit 62 can be an electronic device received in the waterproof housing 61. For example, the operation unit 62 can be a security system, wherein alarm detection equipments, such as security lights and/or surveillance cameras, can be mounted under the waterproof housing 61 while the security wiring system is hidden within the waterproof housing 61. Different sensors, such as light sensors or motion sensors, can also installed under the waterproof housing 61. It is worth mentioning that the operation unit 62 can be configured as an Internet router and/or communication device to be protected by the waterproof housing 61. It is worth mentioning that the rechargeable battery 43 of the third roof functional panel unit 40 can also supported in the waterproof housing 61.

Another application of the operation unit 62 is to configured as a system controller of a water heating system for heating up water for use in the building, a system controller of an energy conversion system for converting energy from natural gas or water into useable energy, such as electrical energy for the building. For example, the collected water can be electrolyzed into hydrogen and oxygen as the fuel. The operation unit 62 can also be an air filtration/purification system for filtering and/or purifying air into the building. The operation unit 62 can also be a climate monitoring system capable of integrating with any external satellite network, providing ground-base data, and forecasting changes in weather and climate.

It is worth mentioning that the functional roof construction arrangement of the present invention provides enough space, such as the lower portion of each of the module housings 101, that the water piping system, the air conditioning piping system, and/or the electrical wiring system of the building can be hidden in the functional roof construction arrangement so as to organize the water/air/electrical wiring configuration and to save the installation space of the building.

Figure 8:
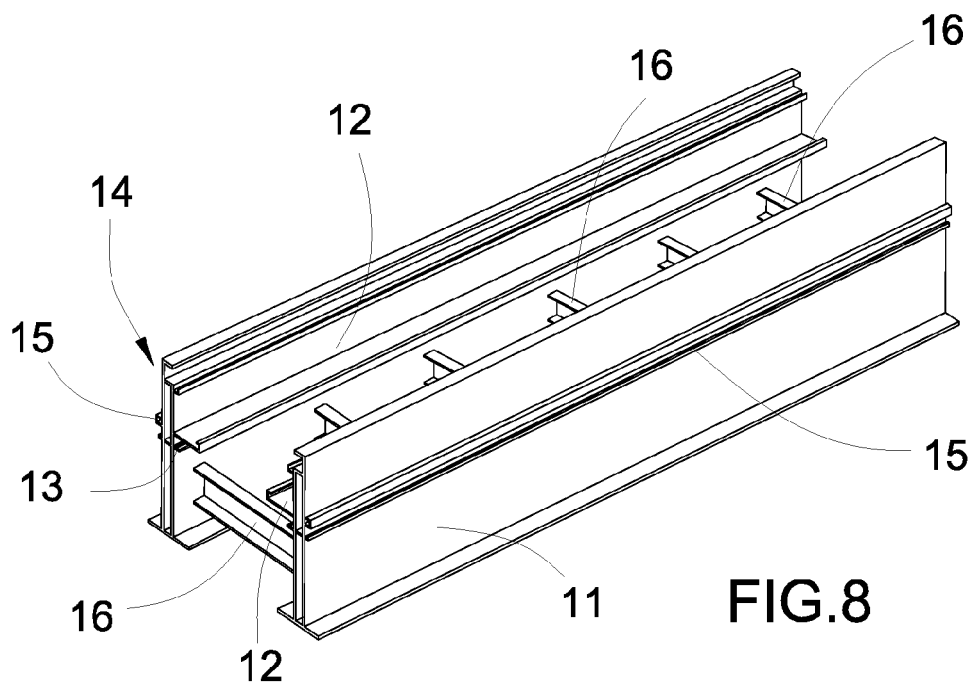
FIG. 8 illustrates the cross bar coupled between the supporting frames according to the above preferred embodiment of the present invention.
Figure 10:
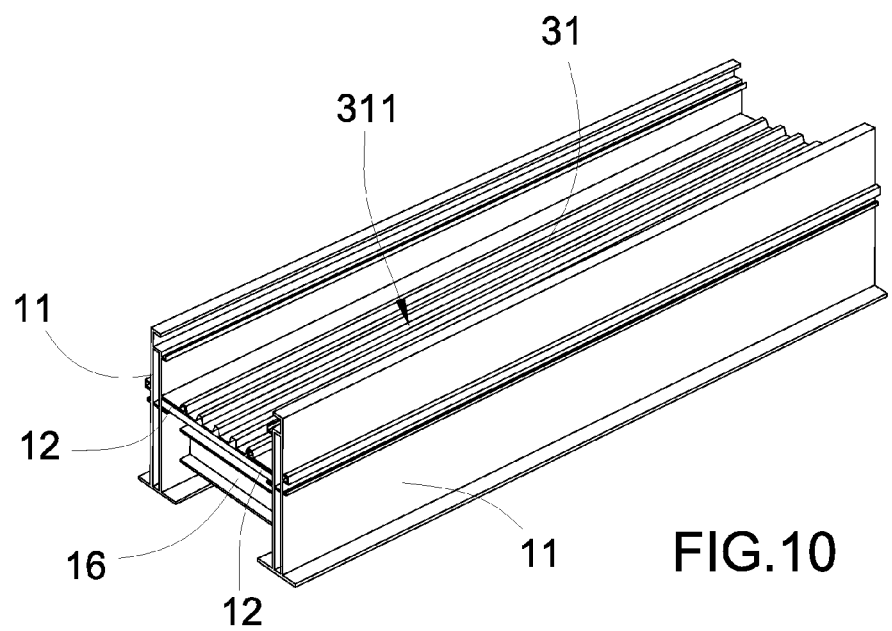
FIG. 10 illustrates the installation of the water guard drainage panel according to the above preferred embodiment of the present invention.
Figure 11:
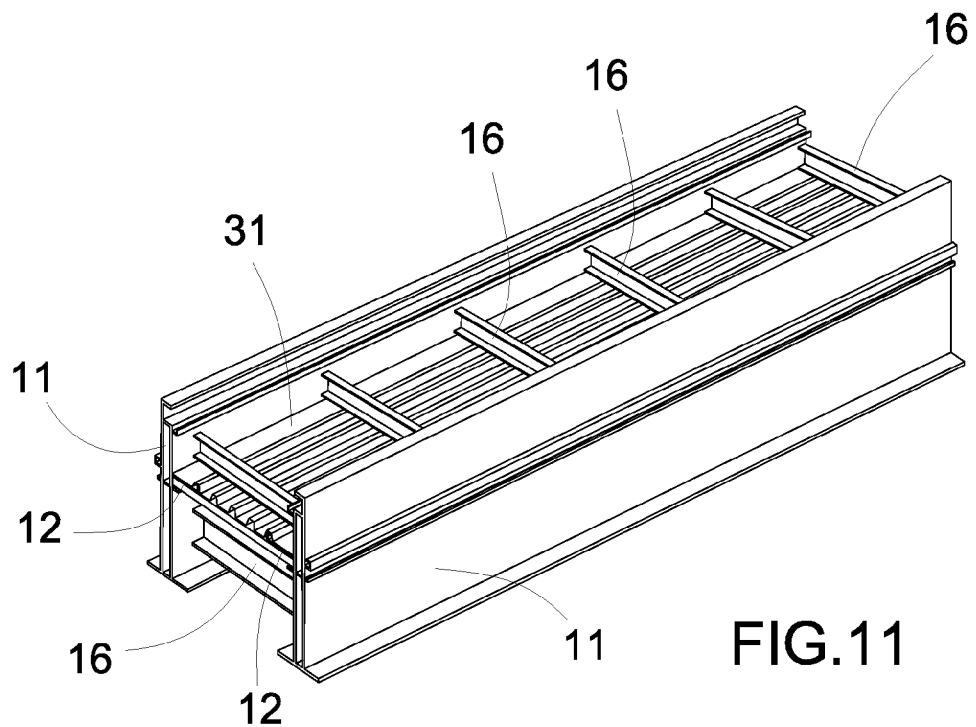
FIG. 11 illustrates the installation of the second set of cross bar according to the above preferred embodiment of the present invention.

According to FIGS. 7 to 15, the configuration of the functional roof module 100 is shown as follows. A width of the functional roof module 100 must be initially determined. Accordingly, depending the size of each of the first, second, and third functional panel units 20, 30, 40, the width of the module housing 101 can be determined. Preferably, the widths of the first, second, and third functional panel units 20, 30, 40 should be the same. Accordingly, the two supporting frames 10 are positioned side-by-side to configure as the width of the module housing 101, as shown in FIG. 7. The module housing 101 further comprises a plurality of reinforcing cross bars 16 spacedly coupled between the supporting frames 10 to retain the width of the module housing 101 and to strengthen the module housing 101, as shown in FIG. 8. Each of the reinforcing cross bars 16 has two ends coupled at the supporting walls 11 of the supporting frames 10 respectively, such as by welding or screws. In particular, the reinforcing cross bars 16 are coupled between the supporting walls 11 at the lower portion of the module housing 101. Preferably, a second set of the reinforcing cross bars 16 can also coupled between the supporting walls 11 at the upper portion of the module housing 101 at a position between the second roof functional panel unit 30 and the third roof functional panel unit 40, as shown in FIG. 11. Preferably, the reinforcing cross bars 16 are H-shaped cross bars or C-shaped cross bars.

Once the distance between the supporting frames 10 are retained by the reinforcing cross bars 16, i.e. the width of the module housing 101, the supporting walls 11 of the supporting frames 10 are extended in parallel. The supporting arms 12 of the supporting frames 10 are spacedly aligned with each other end-to-end and the supporting ridges 13 of the supporting frames 10 are spacedly aligned with each other end-to-end. In addition, the sliding slots 14 of the supporting frames 10 are spacedly aligned and facing with each other, as shown in FIG. 7.

Figure 9:
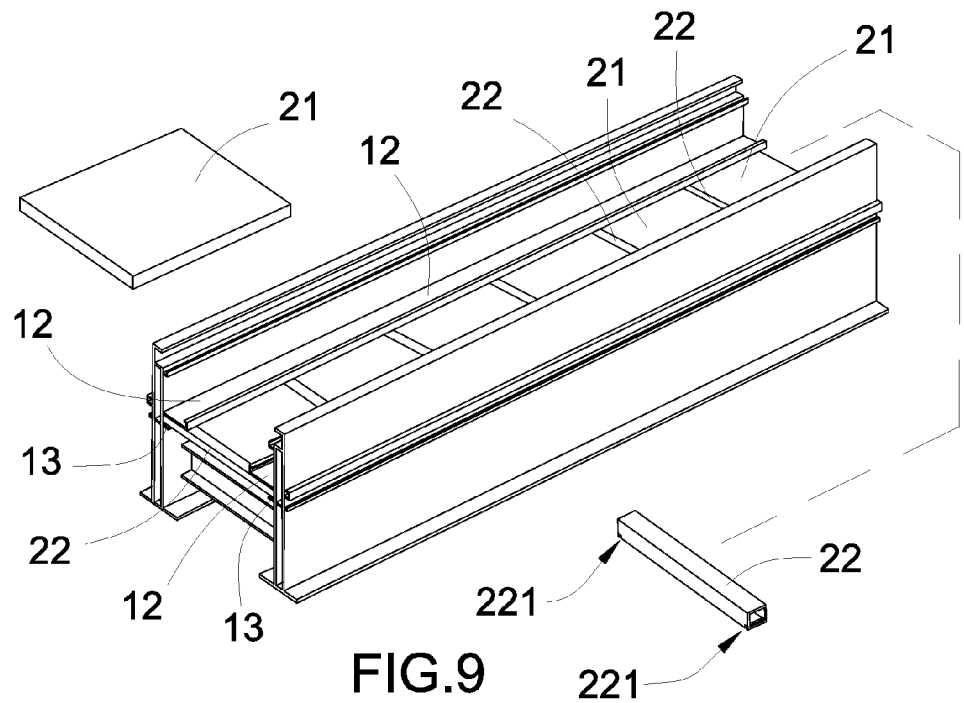
FIG. 9 illustrates the installation of the thermal insulation panels according to the above preferred embodiment of the present invention.
Figure 12:
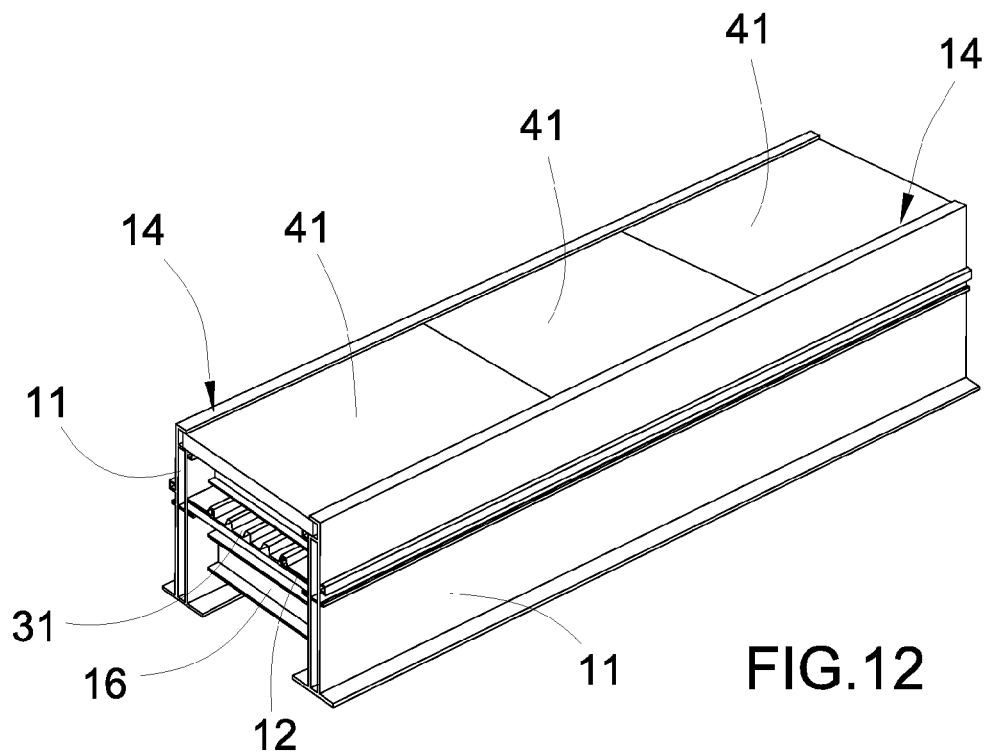
FIG. 12 illustrates the installation of the solar collecting panels according to the above preferred embodiment of the present invention.

Then, the thermal insulation panels 21 and the panel dividers 22 of the first roof functional panel unit 20 can be slid into the module housing 101 in an alternating manner to support by the supporting ridges 13 of the supporting frames 10, as shown in FIG. 9. The water guard drainage panel 31 of the second roof functional panel unit 30 can be slid into the module housing 101 to support by and lock with the supporting arms 12 of the supporting frames 10, as shown in FIG. 10. The panel blockers 32 can be coupled at the top edges of the supporting frames 10 respectively to align with the sliding slots 14 thereof respectively. Once the first and second roof functional panel units 20, 30 are installed into the module housing 101, the solar collecting panels 41 of the third roof functional panel unit 40 can be slidably coupled with the sliding slots 14 of the supporting frames 10 to support at the top edges of the supporting walls 11, as shown in FIG. 12. The panel blockers 32 can be coupled at the top edges of the supporting frames 10 respectively to align with the sliding slots 14 thereof respectively, as shown in FIG. 13. It is worth mentioning that the solar collecting panels 41 will be blocked by the panel blockers 32 for preventing the solar collecting panels 41 being slid downwardly when the module housing 101 is inclinedly supported on the roof. Therefore, the assembly of the functional roof module 100 will be completed.

In order to install the functional roof construction arrangement to the roof frame of the building, the roof area of the roof frame must be measured to determine the numbers of functional roof modules 100 to be used. Then, the functional roof modules 100 aligned in a desired array corresponding to the shape of the roof frame, and the functional roof modules 100 are coupled with each other via the module connectors 50, as shown in FIG. 14. The water collecting gutter 33 can be coupled to the side-slope sides of the functional roof modules 100 and the functional operating module 60 is coupled the functional roof modules 100 under the bottom gutter tray 332 of the water collecting gutter 33, as shown in FIG. 15. Then, the assembly of the functional roof construction arrangement is completed and is ready to mount on the roof frame, as shown in FIGS. 6 and 15. Therefore, the installation of the functional roof construction arrangement of the present invention is simple and easy, and the installation cost thereof will be substantially reduced.

According to the preferred embodiment, the third roof functional panel unit 40 comprises an astronomical roof camera 41' slidably coupled with the sliding slots 14 of the supporting frames 10 to support at the top edges of the supporting walls 11 to replace one of more of the solar collecting panels 41 in the module housing 101. Likewise, the third roof functional panel unit 40 comprises an antenna panel 41" slidably coupled with the sliding slots 14 of the supporting frames 10 to support at the top edges of the supporting walls 11, wherein the antenna panel 41" is arranged for receiving signals. The antenna panel 41" can be a TV antenna for receiving radio wave or a satellite antenna for receiving satellite signal. In other words, each of the functional roof modules 100 can be customized to build-in with a particular function according to the need of the user.

It is worth mentioning that when one of the thermal insulation panels 21, the water guard drainage panel 31, and the solar collecting panels 41 is damaged or malfunctioned, the damage panel can be simply replaced by a new one. Alternatively, only the damaged functional roof module 100 can be replaced by a new one. Therefore, the maintenance cost and the repairing cost of the functional roof construction arrangement of the present invention will be substantially lowered. The size of the functional roof construction arrangement of the present invention is expansible or re-configurable by newly adding the functional roof modules 100 to the existing functional roof modules 100 or removing one of functional roof modules 100 from the existing one so as to re-adjust the size of the functional roof construction arrangement.

FIG. 16 illustrates an alternative mode of the supporting frame 10A according to the above preferred embodiment of the present invention, wherein the height of the lower portion of the module housing 101 is reduced to provide a low profile functional roof module 100. Accordingly, the supporting frames 10A has the same structural configuration to have the supporting wall 11A, the supporting arm 12, the supporting ridge 13, and the sliding slot 14. The modification of the supporting frame 10A is that the height of the supporting wall 11A is shorten to reduce the distance between the base platform 111 and the supporting ridge 13. Therefore, there will be no reinforcing cross bars 16 are coupled between the supporting walls 11A at the lower portion of the module housing 101, wherein only the second set of the reinforcing cross bars 16 can also coupled between the supporting walls 11 at the upper portion of the module housing 101.

Figure 18C:
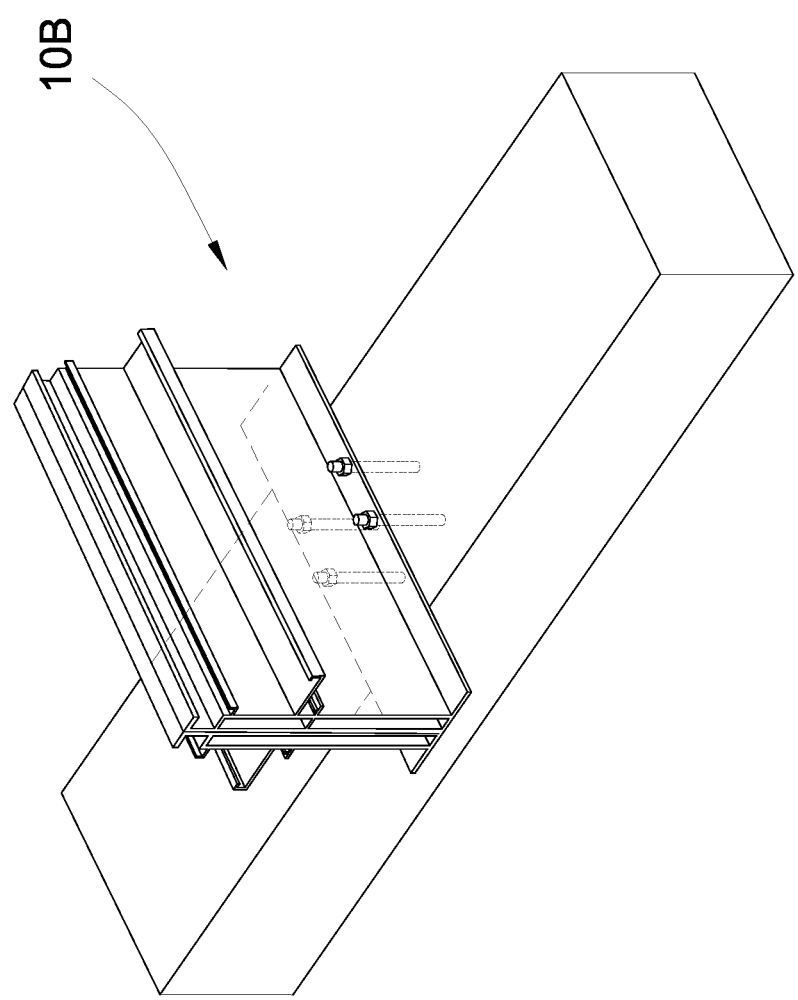
Figure 18D:
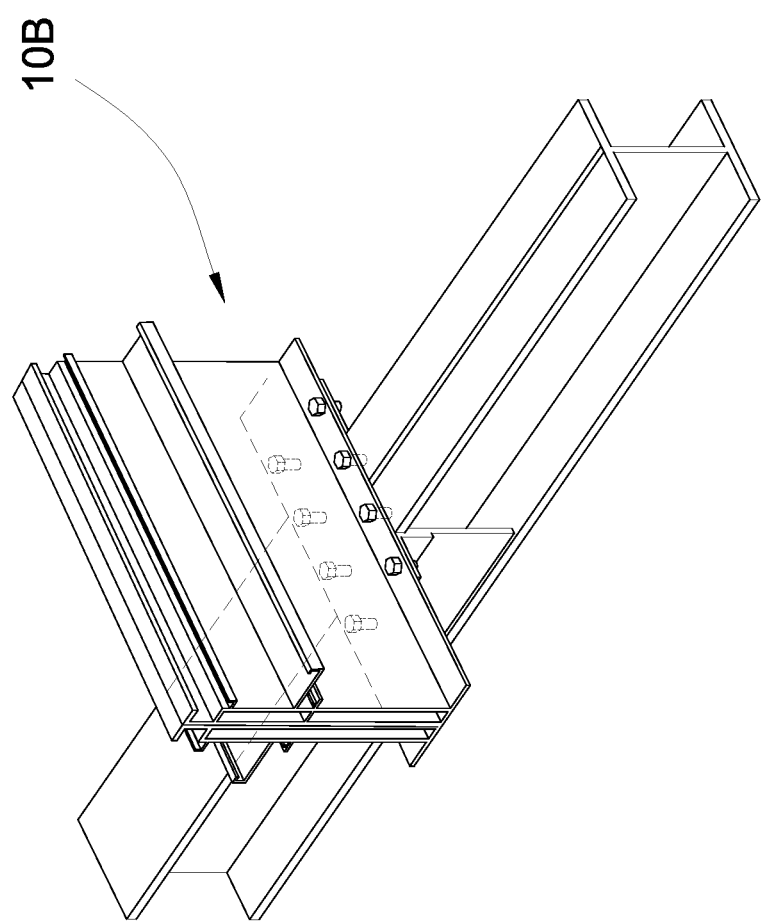

FIG. 17 illustrates an alternative mode of the supporting frame 10B according to the above preferred embodiment of the present invention, wherein the supporting frame 10B has the similar structural configuration of the preferred embodiment. Accordingly, the supporting frame 10B comprises a supporting wall 11B extended vertically, two supporting arms 12B perpendicularly and opposedly extended from the supporting wall 11B, two supporting ridges 13B opposedly extended from the supporting wall 11B at a position parallel to and below the supporting arms 12B, and two sliding slots 14B longitudinally and opposedly formed at the top edge of the supporting wall 11B. Therefore, the supporting frame 10B can support two first roof functional panel units 20 by the supporting ridges 13B respectively, two second roof functional panel units 30 by the supporting arms 12B respectively, and two third roof functional panel units 40 by the sliding slots 14B respectively. In other words, no module connector is omitted by using the supporting frame 10B. In FIG. 18C, the supporting frame 10B is coupled at a roof beam via screws. FIG. 18D, the supporting frame 10B is coupled at a I-shaped roof reinforcing bar via a bar adapter and screws.

Figure 19:
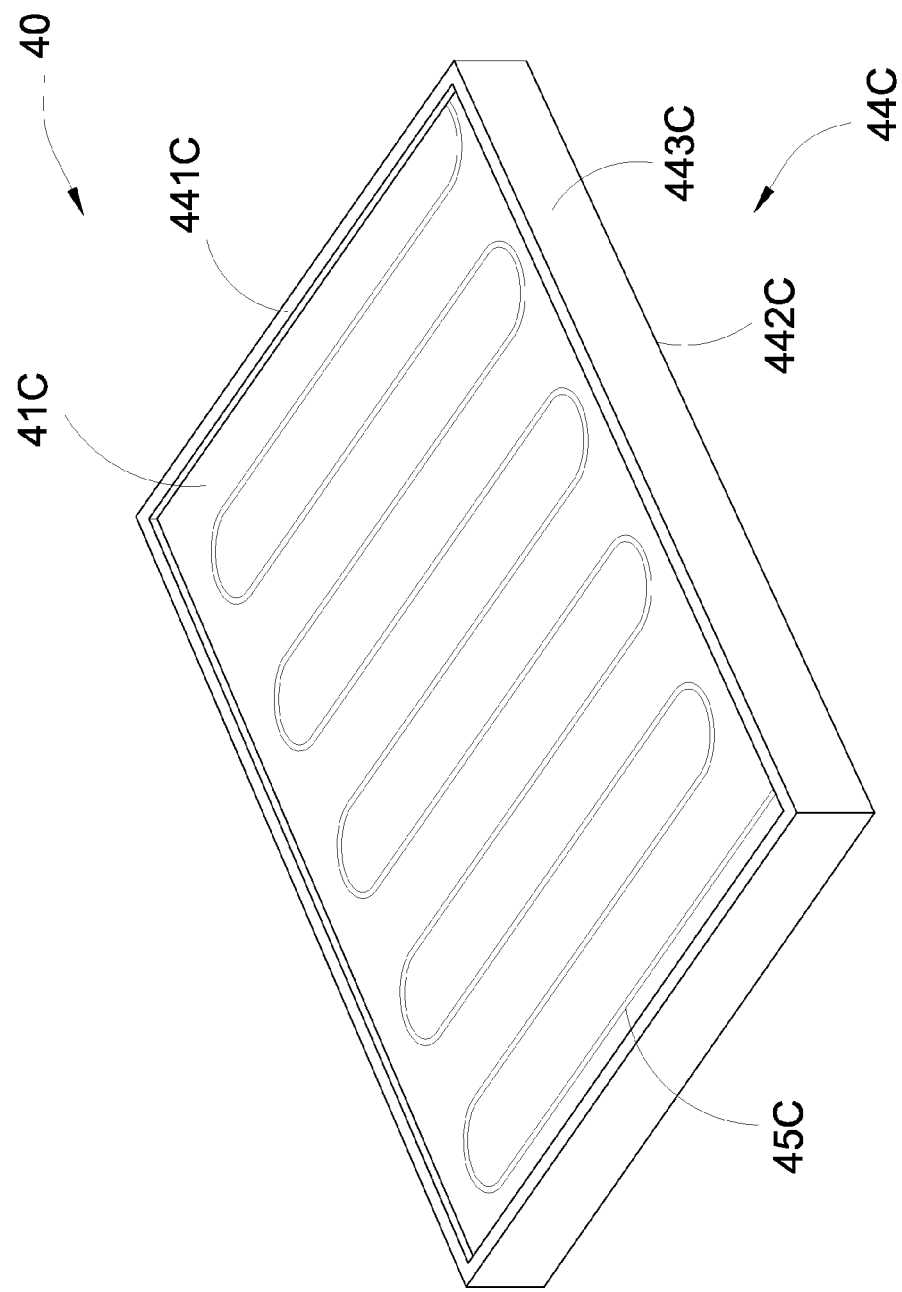
FIG. 19 illustrates a first alternative mode of the solar collecting panel according to the above preferred embodiment of the present invention.

FIG. 19 illustrates a first alternative mode of the solar collecting panel 41C according to the above preferred embodiment, wherein the solar collecting panel 41C has a strength enhancement structure. As shown in FIGS. 19 and 20, the third roof functional panel unit 40 further comprises a rim reinforcing member 44C extended along a rim of the solar collecting panel 41C to reinforce the strength thereof. As shown in FIG. 20, the rim reinforcing member 44C has a top raised rim 441C upwardly extended from a top side of the solar collecting panel 41C and a bottom raised rim 442C downwardly extended from a bottom side of the solar collecting panel 41C. In addition, the rim reinforcing member 44C further has a side cover 443C extended along a sidewall of the solar collecting panel 41C, wherein the top raised rim 441C and the bottom raised rim 412C are integrally extended from the side cover 443C. In other words, the top raised rim 441C is integrally extended from a top edge of the side cover 443C and the bottom raised rim 442C is integrally extended from a bottom edge of the side cover 443C, such that the top raised rim 441C and the bottom raised rim 442C are protruded from the top side and the bottom side of the solar collecting panel 41C respectively. Therefore, the rim edge of the solar collecting panel is encircled by the rim reinforcing member 44C. Preferably, the rim reinforcing member 44C is made of light weight but durable material, such as aluminum, to reinforce the structure of the solar collecting panel 41C. It is worth mentioning that the rim reinforcing member 44C can be integrally formed with the solar collecting panel 41C. Accordingly, the rim reinforcing member 44C is also slidably engaged with the sliding slots 14 of the supporting frames 10 when the solar collecting panel 41C is supported thereby.

The third roof functional panel unit 40 further comprises a heating unit 45C formed at the solar collecting panel 41C for generating heat at the solar collecting panel 41C. Accordingly, the heating unit 45C comprises a heating coil integrated with the solar collecting panel 41C for heating up the top surface of the solar collecting panel 41C. During the snow season, snow may be accumulated on the roof to increase the load thereon. Therefore, the heating unit 45C can be activated to melt the snow on the solar collecting panel 41C to reduce the load thereon.

FIG. 21 illustrates an alternative mode of the rim reinforcing member 44D extended along a rim of the solar collecting panel 41D to reinforce the strength thereof. The rim reinforcing member 44C has one of the top raised rim and the bottom raised rim. As shown in FIG. 21, only the bottom raised rim 442D is downwardly extended from the bottom side of the solar collecting panel 41D. In addition, the rim reinforcing member 44D further has a side cover 443D extended along a sidewall of the solar collecting panel 41D, wherein the bottom raised rim 442D is integrally extended from the side cover 443D. In other words, the bottom raised rim 442D is integrally extended from a bottom edge of the side cover 443D. Therefore, the rim edge of the solar collecting panel is encircled by the rim reinforcing member 44D.

Figure 22:
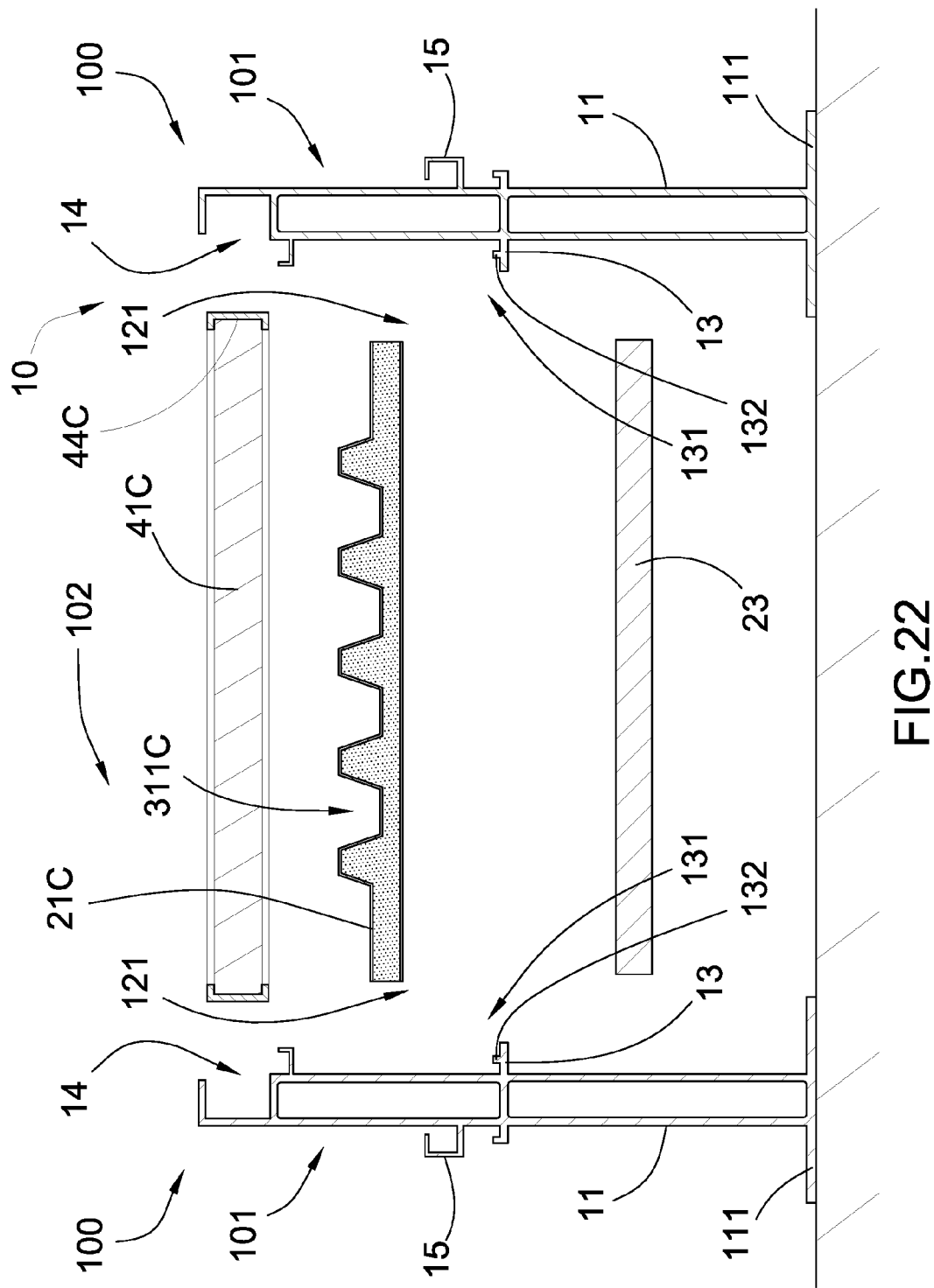
FIG. 22 illustrates an alternative mode of an integrated thermal insulation panel and water guard drainage panel according to the above preferred embodiment of the present invention.

FIG. 22 illustrates an alternative mode of the thermal insulation panel 21C as an integrated thermal insulation and water guard panel to replace the thermal insulation panel 21 and the water guard drainage panel 31, according to the above preferred embodiment of the present invention. Accordingly, the integrated thermal insulation and water guard panel 21C has a corrugated top surface defining a plurality of water drainage channels 311C extended longitudinally along the sloping direction of the roof structure so as to guide the water to flow downwardly. Therefore, the water is collected and is guided to flow along the water drainage channels 311C from the up-slope side of the module housing 101 to the down-slope side thereof at the sloping direction of the roof structure.

The integrated thermal insulation and water guard panel 21C further has a flat bottom surface, wherein the integrated thermal insulation and water guard panel 21C is supported by the supporting ridges 13. Accordingly, the integrated thermal insulation and water guard panel 21C is made of thermal insulation and waterproof material. By combining the thermal insulation panel 21 and the water guard drainage panel 31, the roof structure of the present invention will be simplified to have a two-layered configuration. It is worth mentioning that the supporting arms 12 can be omitted to simplify the structure of the supporting frame 10 because the integrated thermal insulation and water guard panel 21C is supported by the supporting ridges 13.

According to the above preferred embodiment and its alternative modes, the present invention provides a method of installing a functional roof construction arrangement on a roof frame of a building, which comprises the following steps.

(a) Form the plurality of functional roof modules 100 by a step of coupling the first through third roof functional panel units 20, 30, 40 at the module housing 101 at a position that the second roof functional panel unit 30 is located between the first roof functional panel unit 20 and the third roof functional panel unit 40, wherein the first through third roof functional panel units 20, 30, 40 provide different functions.

(b) Couple the functional roof modules 100 with each other.

(c) Install the functional roof modules 100 on the roof frame of the building.

According to the preferred embodiment, each of the functional roof modules 100 is assembled by the following steps.

(a.1) Form the two supporting frames 10, each comprising the supporting wall 11 extended vertically, the supporting arm 12 perpendicularly extended from supporting wall 11 to define an upper portion of the supporting wall 11 above the supporting wall 11 and a lower portion of the supporting wall 11 below the supporting wall 11 for attaching to the roof frame, the supporting ridge 13 extended from the supporting wall 11 at a position parallel to and below the supporting arm 12, and the sliding slot 14 longitudinal formed at a top edge of the supporting wall 11.

(a.2) Spacedly align the supporting frames 10 with each other, such that the supporting arms 12, the supporting ridges 13, and the sliding slots 14 are spacedly aligned with each other.

(a.3) Slidably support the first roof functional panel unit 20 by the supporting ridges 13 of the supporting frames 10.

(a.4) Slidably support the second roof functional panel unit 30 by the supporting arms 12 of the supporting frames 10 at a position below the first roof functional panel 20.

(a.5) Slidably engage the third roof functional panel unit 40 with the sliding slots 14 of the supporting frames 10 at a position spacedly above the first roof functional panel unit 20.

According to the first roof functional panel unit which comprises the plurality of thermal insulation panels 21 and the plurality of panel dividers 22, the step (a.3) further comprises the following steps.

(a.3.1) Support two edge portions of each of the thermal insulation panels 21 by the supporting ridges 13 of the supporting frames 10 respectively.

(a.3.2) Place each of the panel dividers 22 between every two of the thermal insulation panels 21 to retain the thermal insulation panels 21 in position.

(a.3.3) Seal a gap between the panel divider 22 and the thermal insulation panel 21.

In accordance with the second roof functional panel unit 30 which comprises at least the water guard drainage panel 31, the step (a.4) further comprises the following steps.

(a.4.1) Configure each of the supporting arms 12 to have a L-shaped coupling free end.

(a.4.1) Couple two edge portions of the water guard drainage panel 31 at the coupling free ends of said supporting arms 12 of the supporting frames 10 respectively, wherein the water guard drainage panel 31 has the plurality of drainage channels 311 for water guiding, so as to prevent water entering under said water guard drainage panel 31. In which, the water guard drainage panel 31 has the corrugated cross section and defines the plurality of water drainage channels 311 extended longitudinally along the sloping direction of the roof structure to guide the water to flow downwardly and the plurality of engaging channels 312 on the bottom side of the water guard drainage panel 31 to selectively engage with the coupling free ends of the supporting arms 12.

Accordingly, the step (a.4) further comprises a step of coupling the two water drainage gutters 32 at the top edges of said supporting frames 10 respectively to align with said sliding slots 14 thereof respectively for guiding the water to flow from the sliding slots 14 to the water guard drainage panel 31.

Accordingly, the step (a.4) further comprises a step of coupling the water collecting gutter 33 to the module housing 101 for collecting the water from the water guard drainage panel 31 so as to prevent the water flowing to the lower portions of the supporting walls 11.

According to the third roof functional panel unit 40 which comprises the plurality of solar collecting panels 41, the step (a.5) further comprises a step of slidably coupling said solar collecting panels 41 with the sliding slots 14 of the supporting frames 10 to support at the top edges of the supporting walls 11 in an edge-to-edge manner.

When the thermal insulation panel 21C is formed as an integrated thermal insulation and water guard panel, the thermal insulation 21C can be directly coupled to the supporting frames 10 without installing the water guard panel.

According to the preferred embodiment, the step (b) further comprises the following steps.

(b.1) Form a locking ridge 15 at each of the module housings 101.

(b.2) Provide the module connector 50 having two locking edges 51 to engage with the locking ridges 15 of said two module housings 101 respectively when two of the module housings 101 are located side-by-side so as to lock up the functional roof modules 100 with each other.

According to the present invention, the method further comprises a step of coupling the functional operating module 60 to at least one of the functional roof modules 100, wherein said functional operating module 100 has the waterproof housing 61 and the operation unit 62 received in the waterproof housing 61 to provide the additional function for the building.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A functional roof construction arrangement for a roof frame of a building, comprising a plurality of functional roof modules being assembled together to form a rigid roof structure, wherein each of said functional roof modules comprises:
   a module housing which comprises at least a supporting frame; and
   a roof functional panel unit comprising a plurality of thermal insulation panels and a plurality of panel dividers, wherein each of said thermal insulation panels is supported by said supporting frame while each of said panel dividers is located and sealed between every two of said thermal insulation panels to retain said thermal insulation panels in position.

2. The functional roof construction arrangement, as recited in claim 1, wherein each of said thermal insulation panels, which is made of thermal insulation and waterproof material, has a corrugated top surface defining a plurality of water drainage channels extended longitudinally along a sloping direction of the roof structure for guiding water to flow downwardly.

3. The functional roof construction arrangement, as recited in claim 1, further comprising a plurality of solar collecting panels coupled with said supporting frame to support at said solar collecting panels above said thermal insulation panels.

4. The functional roof construction arrangement, as recited in claim 2, further comprising a plurality of solar collecting panels coupled with said supporting frame to support at said solar collecting panels above said thermal insulation panels.

5. The functional roof construction arrangement, as recited in claim 4, further comprising a rim reinforcing member extended along a rim of each of said solar collecting panel, wherein said rim reinforcing member has a bottom raised rim downwardly extended from a bottom side of said solar collecting panel to reinforce a strength thereof.

6. The functional roof construction arrangement, as recited in claim 5, wherein said rim reinforcing member further has a top raised rim upwardly extended from a top side of said solar collecting panel.

7. The functional roof construction arrangement, as recited in claim 6, wherein said rim reinforcing member further has a side cover extended along a sidewall of said solar collecting panel, wherein said top raised rim and said bottom raised rim are integrally extended from a top edge and a bottom edge of said side cover respectively.

8. The functional roof construction arrangement, as recited in claim 3, further comprising a heating unit provided at each of said solar collecting panel for generating heat thereat.

9. The functional roof construction arrangement, as recited in claim 4, further comprising a heating unit provided at each of said solar collecting panel for generating heat thereat.

10. The functional roof construction arrangement, as recited in claim 1, wherein two of said supporting frames are provided that each of said supporting frames comprises supporting wall extended vertically and a supporting ridge extended from said supporting wall, wherein two edge portions of each of said thermal insulation panels are supported by said supporting ridges of said supporting frames respectively.

11. The functional roof construction arrangement, as recited in claim 4, wherein two of said supporting frames are provided that each of said supporting frames comprises supporting wall extended vertically and a supporting ridge extended from said supporting wall, wherein two edge portions of each of said thermal insulation panels are supported by said supporting ridges of said supporting frames respectively.

12. The functional roof construction arrangement, as recited in claim 10, wherein two ends of each of said panel dividers are coupled said supporting ridges of said supporting frames respectively to retain a distance between said supporting frames and to enhance a rigidity of said functional roof module.

13. The functional roof construction arrangement, as recited in claim 11, wherein two ends of each of said panel dividers are coupled said supporting ridges of said supporting frames respectively to retain a distance between said supporting frames and to enhance a rigidity of said functional roof module.

14. The functional roof construction arrangement, as recited in claim 12, wherein each of said supporting frames further has a sliding slot longitudinal formed at a top edge of said supporting wall, wherein said solar collecting panels are slidably coupled with said sliding slots of said supporting frames to support at said top edges of said supporting walls in an edge-to-edge manner.

15. The functional roof construction arrangement, as recited in claim 13, wherein each of said supporting frames further has a sliding slot longitudinal formed at a top edge of said supporting wall, wherein said solar collecting panels are slidably coupled with said sliding slots of said supporting frames to support at said top edges of said supporting walls in an edge-to-edge manner.

16. The functional roof construction arrangement, as recited in claim 10, wherein each of said supporting walls has a hollow structure to define an air chamber therewithin.

17. The functional roof construction arrangement, as recited in claim 10, further comprising a module connector having two locking edges, wherein each of said supporting frames further comprises a locking ridge extended from said supporting wall, such that when two of said module housings are located side-by-side, said locking edges of said module connector are engaged with said locking ridges of said two module housings respectively so as to lock up said functional roof modules with each other.

18. The functional roof construction arrangement, as recited in claim 1, further comprising a functional operating module coupled to at least one of said functional roof modules, wherein said functional operating module has a waterproof housing and an operation unit received in said waterproof housing to provide an additional function for the building.

19. The functional roof construction arrangement, as recited in claim 4, further comprising a functional operating module coupled to at least one of said functional roof modules, wherein said functional operating module has a waterproof housing and an operation unit received in said waterproof housing to provide an additional function for the building.

20. The functional roof construction arrangement, as recited in claim 10, further comprising a functional operating module coupled to at least one of said functional roof modules, wherein said functional operating module has a waterproof housing and an operation unit received in said waterproof housing to provide an additional function for the building.

* * * * *